United States Patent
Fujii

(10) Patent No.: US 6,708,263 B2
(45) Date of Patent: Mar. 16, 2004

(54) DATA TRANSFER MEMORY HAVING THE FUNCTION OF TRANSFERRING DATA ON A SYSTEM BUS

(75) Inventor: Yasuhiro Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/122,179

(22) Filed: Apr. 16, 2002

(65) Prior Publication Data

US 2002/0112136 A1 Aug. 15, 2002

Related U.S. Application Data

(62) Division of application No. 09/129,424, filed on Aug. 5, 1998, now Pat. No. 6,393,541.

(30) Foreign Application Priority Data

Nov. 14, 1997 (JP) .............................. 9-313927

(51) Int. Cl.[7] .............................................. G06F 12/00
(52) U.S. Cl. .......................... 711/167; 711/5; 713/500; 365/233; 365/230.05
(58) Field of Search ..................... 711/5, 167; 713/500; 365/233, 230.05

(56) References Cited

U.S. PATENT DOCUMENTS

| | | | |
|---|---|---|---|
| 5,175,836 A | 12/1992 | Morgan | 711/172 |
| 5,243,703 A | 9/1993 | Farmwald et al. | 395/325 |
| 6,393,541 B1 * | 5/2002 | Fujii | 711/167 |

* cited by examiner

Primary Examiner—Mano Padmanabhan
Assistant Examiner—Mehdi Namazi
(74) Attorney, Agent, or Firm—Arent Fox Kintner Plotkin & Kahn, PLLC

(57) ABSTRACT

A data transfer memory comprises a plurality of memory devices having the function of transferring data on a system bus or a plurality of memory modules each having the plurality of memory devices. Herein, a memory module buffer in each memory device or memory module and a controller chip located on the system bus include a return clock input/output circuit for inputting or outputting a return clock generated using a clock output from a data processing unit such as a CPU, and an output activation circuit for activating output of data from the memory device in response to a data output enabling signal generated by using the return clock output from the return clock input/output circuit.

7 Claims, 18 Drawing Sheets

DATA TRANSFER MEMORY HAVING THE FUNCTION OF TRANSFERRING DATA ON A SYSTEM BUS

This is a Division of application Ser. No. 09/129,424 filed Aug. 5, 1998 U.S. Pat. No. 6,393,541. The disclosure of the prior application(s) is hereby incorporated by reference herein in its entirety.

BACKGROUND OF THE INVENTION

1. Field of the Invention

The present invention relates to a data transfer memory comprising a plurality of memory devices such as a plurality of dynamic random access memories (DRAMs) having the function of transferring data on one system bus within a bus system, or a plurality of memory modules each having such memory devices mounted therein.

Generally, for improving an efficiency of a whole bus system, various kinds of data items must be input or output at high speed between a plurality of memory devices or memory modules and a central processing unit (CPU).

The present invention relates to a data transfer memory device constructed by arranging a plurality of memory devices on a system bus or arranging a plurality of memory modules, each of which has the plurality of memory devices mounted therein, on the system bus. The present invention refers to a technique for continuously transferring various kinds of data items, which are an object of input or output from or to each memory device or memory module, at high speed over a bus line included in the system bus.

2. Description of the Related Art

For an easy understanding of problems underlying a data transfer memory of a prior art, a bus system employing the data transfer memory of the prior art will be described with reference to FIGS. 1 to 3 that will be described in "BRIEF DESCRIPTION OF THE DRAWINGS".

FIG. 1 shows a configuration of a bus system according to the first example of the prior art. The bus system comprises a plurality of memory devices realized with a plurality of Rambus DRAMs that operate in a Rambus mode, or a plurality of memory modules each having the plurality of Rambus DRAMs mounted therein. Note that data transfer bus lines (normally referred to as DQ lines) included in a system bus 7 are omitted from the drawing.

Furthermore, referring to FIG. 1, one chip set (chip set #0) 40 realized with a CPU or the like, a reference signal generator 42, first to m-th memory devices or memory modules 100-1, 100-2, etc., and 100-m (hereinafter a plurality of memory devices or memory modules 100-1 to 100-m where m denotes any positive integer) are interconnected on a clock line included in the system bus 7. The clock line is turned back and used as a data output clock line for use in sending a clock from the plurality of memory devices or memory modules 100-1 to 100-m to the chip set 40, and a data input clock line for use in sending a clock from the chip set 40 to the plurality of memory devices or memory modules 100-1 to 100-m.

Herein, a transfer clock T-CLK is transferred over the data output clock line, and a receive clock R-CLK is transferred over the data input clock line. In this case, the transfer clock T-CLK and receive clock R-CLK are transferred using the same clock line alone. It is thus prevented that data input to each memory device or memory module and data output from each memory device or memory module become out of phase with each other. The level of a signal on the clock line is adjusted using a voltage supplied from a power supply Vt via a level adjustment resistor Rt1.

In the bus system of the first example of the prior art shown in FIG. 1, whichever of the plurality of memory devices that are Rambus DRAMs is accessed, data items output from the plurality of memory devices or memory modules to the chip set 40 have the same timing. However, when a signal delay time t dependent on a system bus length L or the length of bus lines constituting the system bus becomes equal or longer than a half of a data transfer time, the time from the moment when a protocol is input synchronously with the receive clock R-CLK until data is output synchronously with the transfer clock T-CLK becomes short. The upper limit of the system bus length L is therefore restricted. As a data transfer rate increases and becomes higher, the system bus length L must be made smaller.

On the other hand, the time necessary for an acknowledge packet to arrive at the chip set may be monitored. This enables the chip set to detect arrival of data in advance. However, the time necessary for the acknowledge packet to arrive at the chip set is determined by a distance from each memory device or memory module. The chip set must therefore wait for the time.

FIG. 2 shows a configuration of a bus system in accordance with the second example of the prior art. The bus system comprises a plurality of memory devices that operate in a DQ strobe mode, or a plurality of memory modules each having the memory devices mounted therein. Note that a DQ line included in a system bus 7 is omitted from the drawing.

Furthermore, referring to FIG. 2, bus lines constituting the system bus 7 include an MCLK line for use in transferring a main clock MCLK to be sent from one chip set 40 such as a CPU to first to m-th memory devices or memory modules 110-1, 110-2, etc., and 110-m (hereinafter a plurality of memory devices or memory modules 110-1 to 110-m), and a DQS line for use in transferring a DQ strobe DQS originated when data is output from any of the plurality of memory devices or memory modules 110-1 to 110-m. The level of a signal on the MCLK line is adjusted using a voltage supplied from a power supply Vt via a level adjustment resistor Rt2. The level of a signal on the DQS line is adjusted using a voltage supplied from the power supply Vt via another level adjustment resistor Rt3.

Furthermore, referring to FIG. 2, the chip set 40, reference signal generator 42, and plurality of memory devices or memory modules 110-1 to 110-m are interconnected on the MCLK line and DQS line.

In the bus system of the second example of the prior art shown in FIG. 2, the plurality of memory devices or memory modules 110-1 to 110-m receive input data synchronously with the main clock MCLK. On the other hand, the plurality of memory devices or memory modules each output data synchronously with the DQ strobe DQS generated by the memory device or memory module during data output (that is, data reading).

Furthermore, according to another method, when data is input to the plurality of memory devices or memory modules (that is, during data writing), the chip set 40 controls a DQ strobe terminal. The plurality of memory devices or memory modules receives input data according to the timing of controlling the DQ strobe terminal.

According to this method, a signal delay time t dependent on a system bus length L arises. The time necessary for a memory device or memory module to receive a read instruction for instructing data reading, or the time necessary for the chip set 40 to receive data output from a memory devices or memory module varies depending on the position of the memory device or memory module. In this case, a first access time necessary for the chip set 40 to receive data for the first time after the chip set 40 issues the read instruction cannot be controlled by the chip set 40. The chip set 40 must therefore change the position of a data reception window according to data output from a memory device or memory module.

In particular, the time required to receive data output from the first memory device or memory module 110-1 located closest to the chip set 40 differs greatly from the time required to receive data output from the m-th memory device or memory module 110-*m* located farthest from the chip set 40. Every time the chip set 40 receives data from any of the memory devices or memory modules, it must reset the position of the data reception window.

FIG. 3 shows a configuration of a bus system in accordance with the third example of the prior art. The bus system comprises a plurality of memory modules each having a plurality of memory devices, which operate in a return clock mode, mounted therein.

Furthermore, referring to FIG. 3, bus lines constituting a system bus 7 include an MCLK line for use in transferring a main clock MCLK, which is sent from a chip set 40 to first to m-th memory modules 120-1, 120-2, etc., and 120-*m* (hereinafter a plurality of memory modules 120-1 to 120-*m*), during data input, and an RCLK line for use in transferring a return clock RCLK, which is sent from the plurality of memory modules 120-1 to 120-*m* to the chip set 40, during data output. The level of a signal on the MCLK line is adjusted using a voltage supplied from a power supply Vt via a level adjustment resistor Rt4. The level of a signal on the RCLK line is adjusted using a voltage supplied from the power supply Vt via another level adjustment resistor Rt5.

Even in FIG. 3, like the first example of a prior art shown in FIG. 1, the one chip set 40 formed with a CPU or the like, reference signal generator 42, and plurality of memory modules 120-1 to 120-*m* are interconnected on the MCLK line, RCLK line, and DQ line included in the system bus 7.

However, in the bus system of the third example of the prior art shown in FIG. 3, unlike the first example of the prior art shown in FIG. 1, a module buffer composed of a delayed lock loop (DLL) 500 for adjusting the phase of a clock and a buffer amplifier 510 is included in each of the memory modules 120--1 to 120-*m*. Moreover, a power supply Vcc for supplying a voltage used to drive each semiconductor device in each memory module is connected to an enabling terminal EN of the memory module 120-*m* located farthest from the chip set 40 via a level adjustment resistor Rpm.

In this case, the module buffer in the memory module 120-*m* is activated according to the voltage level at the enabling terminal EN (herein, the level of a supply voltage supplied from the power supply Vcc) in response to the main clock MCLK transferred from the chip set 40. The thus activated module buffer receives the main clock MCLK, and causes the DLL 510 thereof to correct the phase of the main clock MCLK. The main clock MCLK is used as a clock for achieving synchronization of data output performed by the plurality of memory devices mounted in each memory module. In this case, therefore, the return clock RCLK is generated by the memory module instead of the transfer clock T-CLK employed in the first example of a prior art shown in FIG. 1. In the return clock mode, like the Rambus mode employed in the first example of a prior art, whichever of the memory modules is accessed, data output from an accessed memory module arrives at the chip set 40 according to the same timing.

However, even in the return clock mode, when a signal delay time t dependent on a system bus length L becomes equal to or longer than a half of a data transfer time, there arises a difference in access time between data in the memory module 120-1 located closest to the chip set 40 and data in the memory module 120-*m* located farthest therefrom in the same manner as in the Rambus mode adopted in the first example of a prior art.

As mentioned above, in the bus system of the first example of the prior art, as a signal delay time dependent on the length of bus lines constituting a system bus gets longer, the time for which a chip set must wait for data sent from a memory device located farthest from the chip set gets longer. It therefore becomes hard to transfer data at high speed. This poses a problem that an efficiency of the whole system deteriorates.

Furthermore, in the bus system of the second example of the prior art, when a signal delay time dependent on the length of bus lines constituting a system bus gets longer, the time necessary for a chip set to receive data output from a memory device or memory module differs among memory devices or memory modules. Accordingly, the position of a data reception window in the chip set must be changed according to the position of a memory device or memory module relative to the chip set. This poses a problem that an efficiency of the whole system deteriorates.

Furthermore, in the bus system of the third example of the prior art, when a signal delay time dependent on the length of bus lines constituting a system bus becomes equal to or longer than a half of a data transfer time, the time necessary for data in a memory module located closest to a chip set to arrive at the chip set, and the time necessary for data in a memory module located farthest therefrom to arrive at the chip set become mutually different like those in the first example of the prior art. Consequently, like the first example of the prior art, it becomes hard to transfer data at high speed. This poses a problem that an efficiency of the whole system deteriorates.

SUMMARY OF THE INVENTION

The present invention attempts to solve the foregoing problems. An object of the present invention is to provide a data transfer memory making it possible to transfer various kinds of data items continuously at high speed between a plurality of memory devices or memory modules and a CPU or the like, and to improve an efficiency of the whole system.

For solving the foregoing problems, according to the present invention, there is provided a data transfer memory comprising a plurality of memory devices that have the function of transferring data on one system bus and are controlled by a data processing unit for processing the data. The plurality of memory devices each comprise: a return clock input/output circuit for inputting or outputting a return clock generated using a clock output from the data processing unit; and an output activation circuit for activating output of the data in response to a data output enabling signal generated synchronously with the return clock output from the return clock input/output circuit.

Preferably, in the data transfer memory of the present invention comprising the plurality of memory devices, only a memory device located at a given position generates the return clock and data output enabling signal.

Furthermore, preferably, in the data transfer memory of the present invention comprising the plurality of memory devices, the memory device located at the given position is a memory device located farthest from the data processing unit on the system bus.

More preferably, in the data transfer memory of the present invention comprising the plurality of memory devices, the plurality of memory devices except the memory device located at the given position are selected to output data by means of the data processing unit, they receive as inputs the return clock and data output enabling signal generated by the memory device located at the given position. Output of the data is activated in response to the data output enabling signal. The data is output synchronously with the return clock.

Furthermore, preferably, in the data transfer memory of the present invention comprising the plurality of memory devices, when the memory device located at the given position is selected to output data by means of the data processing unit, output of the data is activated in response to a data output enabling signal generated by the memory device located at the given position. The data is output synchronously with a return clock generated by the memory device located at the given position.

Furthermore, preferably, in the data transfer memory of the present invention comprising the plurality of memory devices, the return clock and the data output enabling signal are each set to any phase. The adjustment of the phases of the return clock and data output enabling signal is carried out by a DLL or the like in each memory device.

Furthermore, preferably, in the data transfer memory of the present invention comprising the plurality of memory devices, an input circuit portion of the data processing unit and an input circuit portion of the output activation circuit in each memory device are activated only for a given time in response to the data output enabling signal.

Furthermore, preferably, in the data transfer memory of the present invention comprising the plurality of memory devices, a controller chip for outputting the return clock and the data output enabling signal is installed on the system bus.

According to the present invention, there may be provided a data transfer memory comprising a plurality of memory modules, in place of the plurality of memory devices described above. Herein, the plurality of memory modules each include a plurality of memory devices and a memory module buffer for use in inputting or outputting the data and various kinds of signals between the plurality of memory devices and the data processing unit.

Furthermore, the memory module buffer includes a return clock input/output circuit for inputting or outputting a return clock generated using a clock output from the data processing unit, and an output activation circuit for activating output of the data in response to the data output enabling signal generated using the return clock output from the return clock input/output circuit.

Preferably, in the data transfer memory of the present invention comprising the plurality of memory modules, only a memory module buffer in a memory module located at a given position on the system bus generates the return clock and data output enabling signal.

Furthermore, preferably, in the data transfer memory of the present invention comprising the plurality of memory modules, the memory module located at the given position is a memory module located farthest from the data processing unit on the system bus.

Furthermore, preferably, in the data transfer memory of the present invention comprising the plurality of memory modules, when a memory module buffer other than the memory module buffer located at the given position is selected for outputting data by means of the data processing unit, the return clock and data output enabling signal generated using the memory module buffer in the memory module located at the given position are received as inputs. The return clock and data output enabling signal are then supplied to memory devices in the memory module selected to output data.

Furthermore, preferably, in the data transfer memory of the present invention comprising the plurality of memory modules, when a memory device in a memory module other than the memory module located at the given position is selected to output data by means of the data processing unit, the data output enabling signal supplied from the memory module buffer in the memory module located at the given position is received as an input. Output of the data is activated in response to the data output enabling signal, and the data is transmitted to an associated memory module buffer synchronously with the return clock.

Furthermore, preferably, in the data transfer memory of the present invention comprising the plurality of memory modules, when a memory device mounted in the memory module located at the given position is selected to output data by the data processing unit, the return clock and data output enabling signal generated using the memory module buffer in the memory module located at the given position are received as inputs. Output of the data is activated in response to the data output enabling signal, and the data is transmitted to the memory module buffer in the memory module located at the given position synchronously with the return clock.

Furthermore, preferably, in the data transfer memory of the present invention comprising the plurality of memory modules, the return clock and data output enabling signal are each set to any phase. The adjustment of the phases of the return clock and data output enabling signal is carried out by a DLL or the like included in the memory module buffer.

Furthermore, preferably, in the data transfer memory of the present invention comprising the plurality of memory modules, an input circuit portion of the data processing unit and an input circuit portion of each memory module buffer are activated only for a given time in response to the data output enabling signal.

According to the data transfer memory of the present invention comprising a plurality of memory device or memory modules, a memory device or memory module located farthest from the data processing unit formed with a CPU or the like generates a return clock. The return clock is used to generate a data output enabling signal for activating an output circuit portion of any memory device or memory module. The data output enabling signal flows in the same direction as the return clock synchronously with the return clock. However large a system bus length may be, even when a data transfer rate is so high that a data transfer time becomes equal to or shorter than a signal delay time, data can be transferred from any memory device or memory module on the system bus to the data processing unit formed with a CPU or the like for the same access time.

Briefly, according to the present invention, various kinds of data items can be transferred continuously at high speed between a plurality of memory devices or memory modules and a CPU or the like. A data transfer rate in a bus system can be retained at a maximum rate, and an efficiency of the whole system can be improved.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Preferred embodiments of the present invention will be described with reference to FIGS. 4 to 21.

Figure 4:
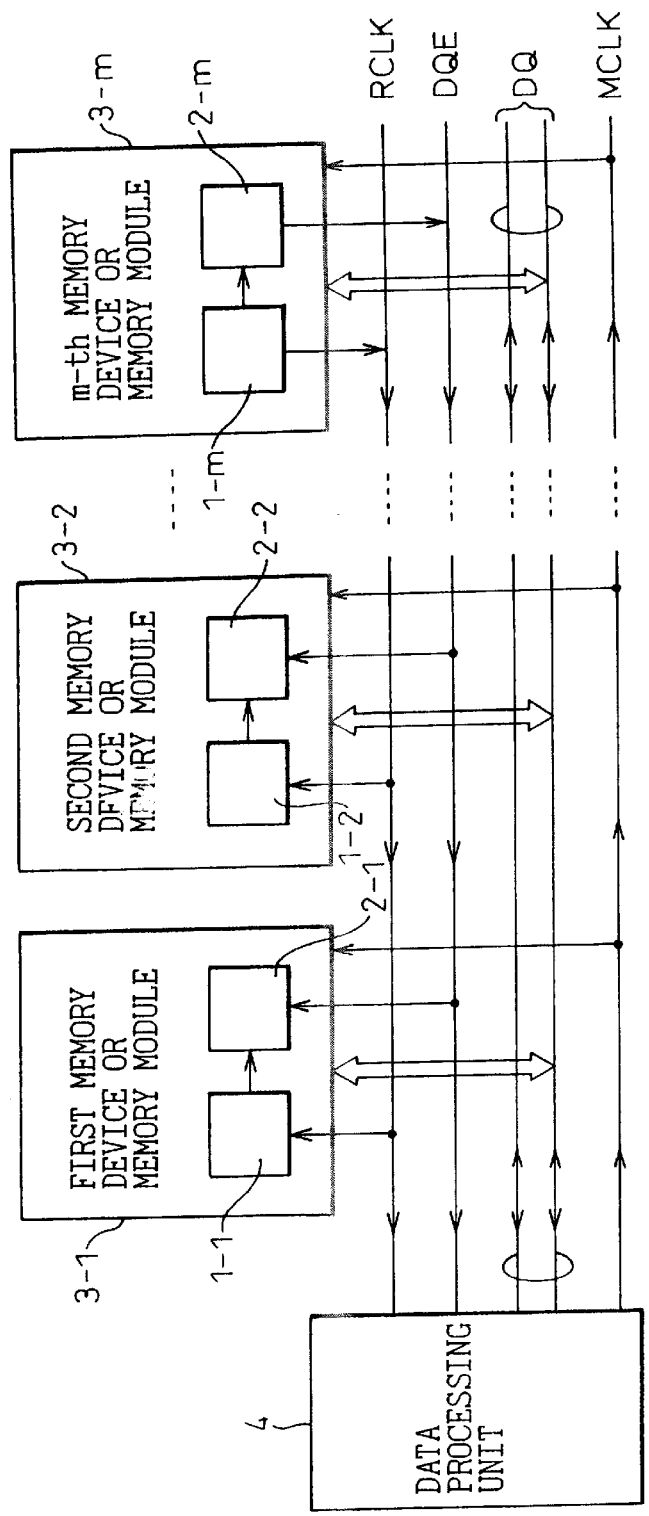
FIG. 4 is a block diagram showing a configuration of a fundamental embodiment based on the principles of the present invention.

FIG. 4 is a block diagram showing a configuration of a fundamental embodiment based on the principles of the present invention. Hereinafter, the same reference numerals will be assigned to components identical to those described previously.

As shown in FIG. 4, according to the fundamental embodiment of the present invention, a data transfer memory comprises a plurality of memory devices that have the function of transferring data on one system bus 7, and are controlled by a data processing unit 4 formed with a CPU or the like for processing the data. Alternatively, the data transfer memory includes a plurality of memory modules each having a plurality of memory devices mounted therein. Herein, for simplification of the diagram showing the principles of the invention, the aforesaid plurality of memory devices or the plurality of memory modules to be described later will be expressed as first to m-th memory devices or memory modules 3-1 to 3-*m* (m denotes any positive integer).

According to the fundamental embodiment of the present invention, in the data transfer memory having the plurality of memory devices shown in FIG. 4, the plurality of memory devices (first to m-th memory devices 3-1 to 3-*m*) each comprise a return clock input/output circuit (first to m-th return clock input/output circuits 1-1 to 1-*m*) for inputting or outputting a return clock RCLK generated using a clock output from the data processing unit 4, and an output activation circuit (first to m-th output activation circuits 2-1 to 2-*m*) for activating output of the data in response to a data output enabling signal DQE generated using the return clock RCLK output from the return clock input/output circuit.

Preferably, according to the fundamental embodiment of the present invention, in the data transfer memory having the plurality of memory devices, only a memory device located at a given position on the system bus 7 generates the return clock RCLK and data output enabling signal DQE.

Furthermore, preferably, according to the fundamental embodiment of the present invention, in the data transfer memory having the plurality of memory devices, the memory device located at the given position is a memory device located farthest from the data processing unit 4 on the system bus 7 (in FIG. 4, the m-th memory device 3-*m*).

Furthermore, preferably, according to the fundamental embodiment of the present invention, in the data transfer memory having the plurality of memory devices, when the plurality of memory devices 3-1 to 3-*m* other than the memory device located at the given position are selected to output data by the data processing unit 4, they receive as inputs the return clock RCLK and data output enabling signal DQE generated by the memory device located at the given position. Output of the data is activated in response to the data output enabling signal DQE, and the data is output synchronously with the return clock RCLK.

Furthermore, preferably, according to the fundamental embodiment of the present invention, in the data transfer memory having the plurality of memory devices, when the memory device located at the given position (for example, the m-th memory device 3-*m*) is selected to output data by the data processing unit 4, output of the data is activated in response to the data output enabling signal DQE generated by the memory device located at the given position (that is, an own memory device or the same memory device). The data can be output synchronously with the return clock RCLK generated by the memory device located at the given position.

Furthermore, preferably, according to the fundamental embodiment of the present invention, in the data transfer memory having the plurality of memory devices, the return clock RCLK and data output enabling signal DQE are each set to any phase. The adjustment of the phases of the return clock RCLK and data output enabling signal DQE is carried out by a DLL or the like in each memory device.

Furthermore, preferably, according to the fundamental embodiment of the present invention, in the data transfer memory having the plurality of memory devices, an input circuit portion of the data processing unit 4 and an input circuit portion of the output activation circuit in each memory device are activated only for a given time in response to the data output enabling signal DQE.

On the other hand, according to the fundamental embodiment of the present invention, there is provided a data transfer memory having a plurality of memory modules shown in FIG. 4 Herein, the plurality of memory modules (first to m-n memory modules 3-1 to 3-*m*) each include a memory module buffer for use in inputting or outputting various kinds of signals between a memory module and the data processing unit 4.

Furthermore, the memory module buffer includes a return clock input/output circuit (first to m-th return clock input/output circuits 1-1 to 1-*m*) for inputting or outputting the return clock RCLK generated using a clock (for example, a main clock MCLK) output from the data processing unit 4, and an output activation circuit (first to m-th output activation circuits 2-1 to 2-*m*) for activating output of the data in response to the data output enabling signal DQE generated using the return clock RCLK output from the return clock input/output circuit.

Preferably, according to the fundamental embodiment of the present invention, in the data transfer memory having a plurality of memory modules, only a memory module buffer in a memory module located at a given position on the system bus 7 generates the return clock RCLK and data output enabling signal DQE.

Furthermore, preferably, in the data transfer memory of the present invention having the plurality of memory modules, the memory module located at the given position is a memory module located farthest from the data processing unit 4 (in FIG. 4, the m-th memory module 3-*m*).

Furthermore, preferably, according to the fundamental embodiment of the present invention, in the data transfer memory having a plurality of memory modules, when a memory module buffer other than a memory module buffer located at a given position is selected to output data by the data processing unit 4, the return clock RCLK and data output enabling signal DQE generated using the memory module buffer in the memory module located at the given position are received as inputs, and supplied to a memory device in the memory module selected to output data.

Furthermore, preferably, according to the fundamental embodiment of the present invention, in the data transfer memory having a plurality of memory modules, when a memory device in a memory module other than the memory module located at the given position is selected to output data by the data processing unit 4, a data output enabling signal DQE supplied from a memory module buffer in the memory module located at the given position is received as an input. Output of the data is activated in response to the data output enabling signal DQE. The data is transmitted to an associated memory module buffer synchronously with a return clock RCLK.

Furthermore, preferably, according to the fundamental embodiment of the present invention, in the data transfer memory having a plurality of memory modules, when a memory device mounted in the memory module located at the given position is selected to output data by the data processing unit 4, the return clock RCLK and data output enable signal DQE generated using a memory module buffer in the memory module located at the given position (that is, an own memory module buffer) are received as inputs. Output of the data is activated in response to the data output enabling signal DQE. Moreover, the data can be transmitted to the memory module buffer in the memory module located at the given position synchronously with the return clock RCLK.

Furthermore, preferably, according to the fundamental embodiment of the present invention, in the data transfer memory having a plurality of memory modules, the return clock RCLK and data output enabling signal DQE are each set to any phase. The adjustment of the phases of the return clock RCLK and data output enabling signal DQE is carried out by a DLL or the like included in a memory module buffer.

Furthermore, preferably, according to the fundamental embodiment of the present invention, in the data transfer memory having a plurality of memory modules, an input circuit portion of the data processing unit 4 and an input circuit portion of each memory module buffer are activated only for a given time in response to the data output enabling signal DQE.

According to the fundamental embodiment of the present invention, in the data transfer memory having a plurality of memory devices or memory modules, a memory device or memory module (for example, the m-th memory device or memory module) located farthest from the data processing unit 4 formed with a CPU and the like generates a return clock RCLK. The return clock RCLK, is used to generate a data output enabling signal DQE for activating an output circuit portion of any memory device or memory module is generated. The data output enabling signal DQE flows in the same direction as the return clock RCLK synchronously with the return clock RCLK (that is, toward the data processing unit 4). However large a system bus length may be, even when a data transfer rate is so high that a data transfer time becomes equal to or shorter than a half of a signal delay time t, data can be transferred from any memory device or memory module on the system bus 7 to the data processing unit 4 formed with a CPU or the like for the same access time.

In particular, when a large-scale bus system permitting a data transfer rate of gigabytes (GB) to terabytes (TB) per second is constructed, a maximum data transfer rate permitted by the system can be maintained. The only drawback (penalty) occurring when such a large-scale bus system is constructed is a lag in access time required for accessing first data (data to be received first by the data processing unit 4 after the data processing unit 4 such as a CPU issues a read instruction). Moreover, the lag in access time required for accessing the first data can be equalized among memory devices or memory modules. Data processing to be carried out by the data processing unit 4 becomes simpler. Besides, when a resistor or the like is set properly, the return clock PCLK can be phased with a main clock MCLK, which is generated by the data processing unit 4, by the data processing unit 4. This leads to an improved efficiency of the whole system.

Finally, according to the fundamental embodiment of the present invention, various kinds of data items can be transferred continuously at high speed between a plurality of memory devices or memory modules and a CPU or the like. A maximum transfer rate permitted by a bus system can be maintained. Moreover, the efficiency of a whole system can be improved.

Figure 5:
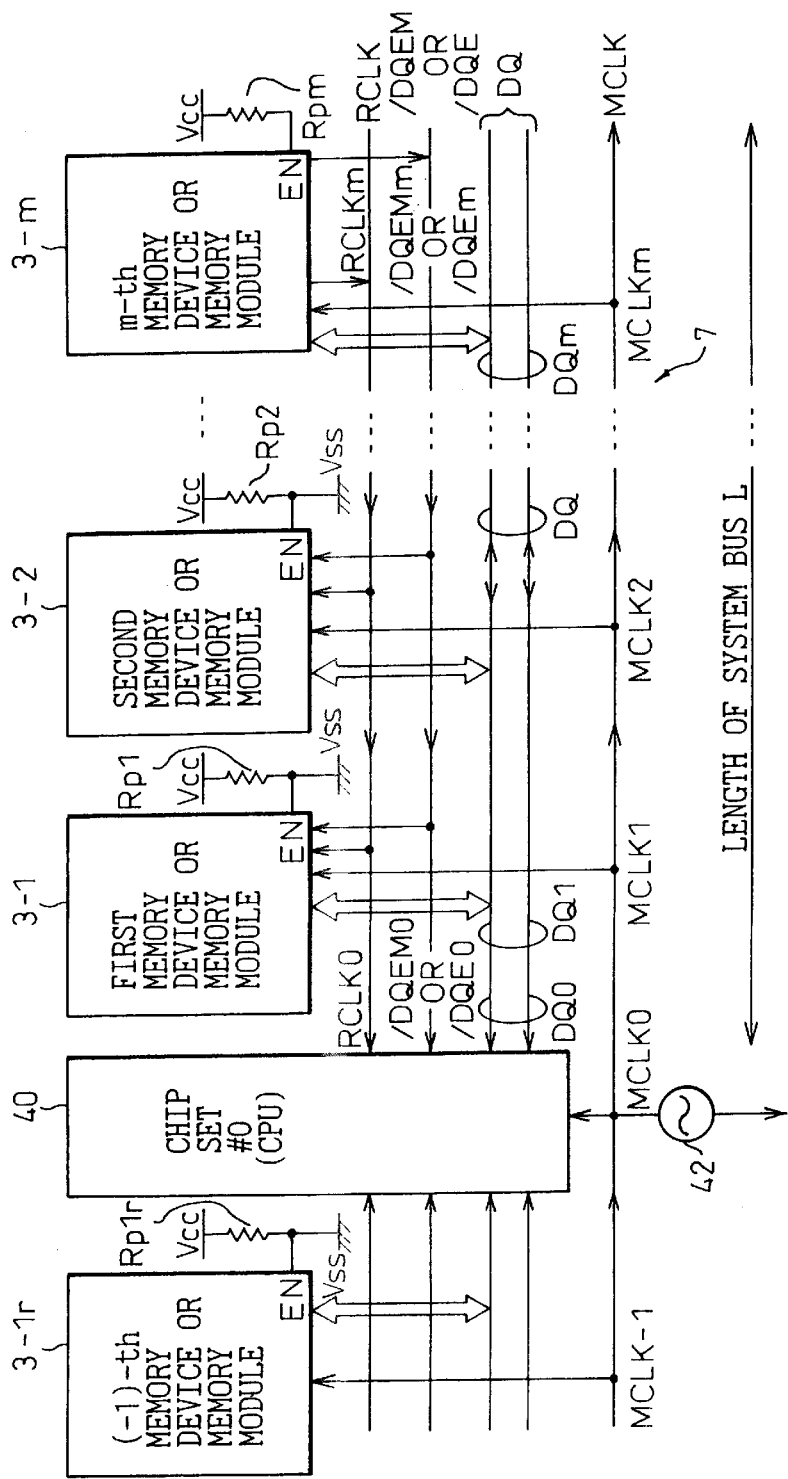
FIG. 5 is a block diagram showing a configuration of a bus system in accordance with one preferred embodiment of the present invention.
Figure 6:
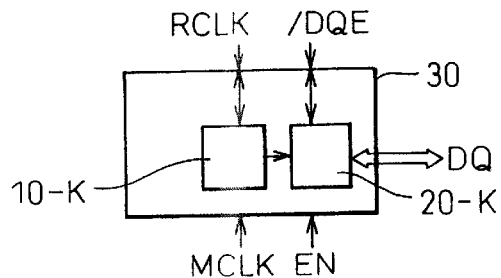
FIG. 6 is a diagram showing an example of a memory device employed in one preferred embodiment of the present invention.
Figure 7:
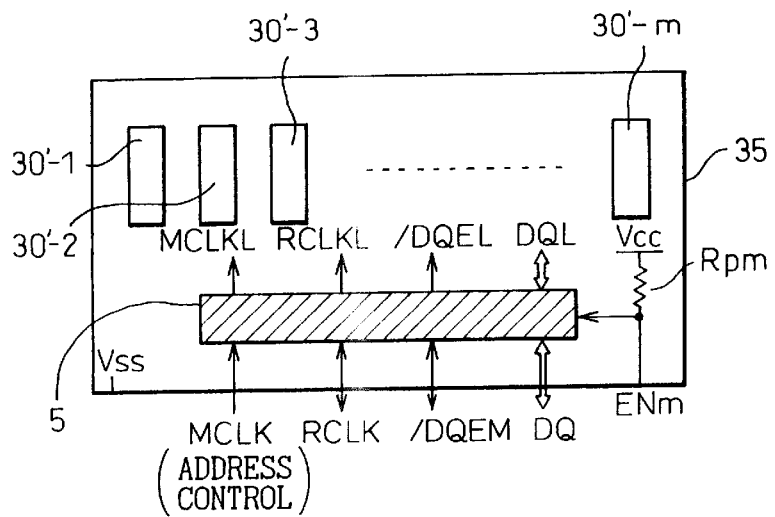
FIG. 7 is a block diagram showing an example of a memory module buffer employed in one preferred embodiment of the present invention.
Figure 8:
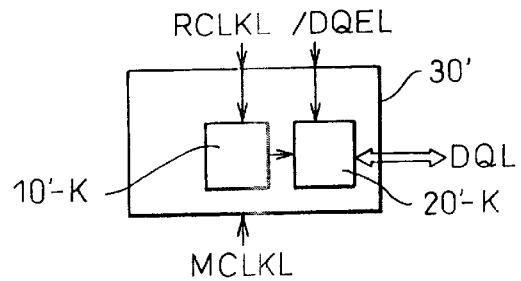
FIG. 8 is a block diagram showing an example of a memory device employed in the memory module shown in FIG. 7.

FIG. 5 is a block diagram showing a configuration of a system bus in accordance with one preferred embodiment of the present invention. FIG. 6 is a diagram showing an example of a memory device employed in one preferred embodiment of the present invention. FIG. 7 is a block diagram showing an example of a memory module buffer employed in one preferred embodiment of the present invention. FIG. 8 is a block diagram showing an example of a memory device employed in the memory module shown in FIG. 7.

One preferred embodiment of the present invention shown in FIGS. 5 to 7 is, fundamentally, a bus system devised in order to compensate for the drawback of the aforesaid bus system (See FIG. 3) of the return clock mode in accordance with the third example of the prior art. One preferred embodiment of the present invention can be adapted not only to a memory module having a plurality of memory devices mounted therein but also to a single memory device.

In FIG. 5, bus lines constituting a system bus 7 include an MCLK line for use in transferring a main clock MCLK from a chip set (chip set #0) such as a CPU, which realizes a data processing unit 4 (FIG. 4), to (−1)-th to m-th memory devices or memory modules 3-1r, 3-1, 3-2, etc., and 3-m (hereinafter, a plurality of memory devices or memory modules 3-1r to 3-m), and an RCLK line for use in transferring a return clock RCLK sent from the plurality of memory modules 3-1r to 3-m to the chip set 40. Herein, the (−1)-th memory device 3-1r is illustrated in order to demonstrate that the system bus 7 is extending in every direction from the chip set 40, and the plurality of memory devices or memory modules can be arranged on the system bus 7.

Furthermore, herein, a phase shift occurring in the plurality of memory devices or memory modules 3-1r to 3-m is taken into account. A main clock to be input to the memory devices or memory modules is denoted by MCLK-1 to MCLK-M. Furthermore, the m-th memory device or memory module 3-m located farthest from the chip set 40 generates a return clock RCLKm and outputs it onto the RCLK line. Incidentally, a main clock about to arrive at the chip set 40 is denoted by MCLK0, and a return clock about to arrive at the chip set 40 is denoted by RCLK0.

Furthermore, the bus lines constituting the system bus 7 include a DQ line for use in transferring data between the chip set 40 and the plurality of memory devices or memory modules 3-1 to 3-m. A phase shift of data input or output to or from the plurality of memory devices or memory modules interconnected on the DQ line is taken into account. Consequently, a data input/output signal relevant to data items in the memory devices or memory modules is denoted by DQ1 to DQm. Moreover, a data input/output signal relevant to data about to arrive at the chip set 40 is denoted by DQ0.

Figure 3:
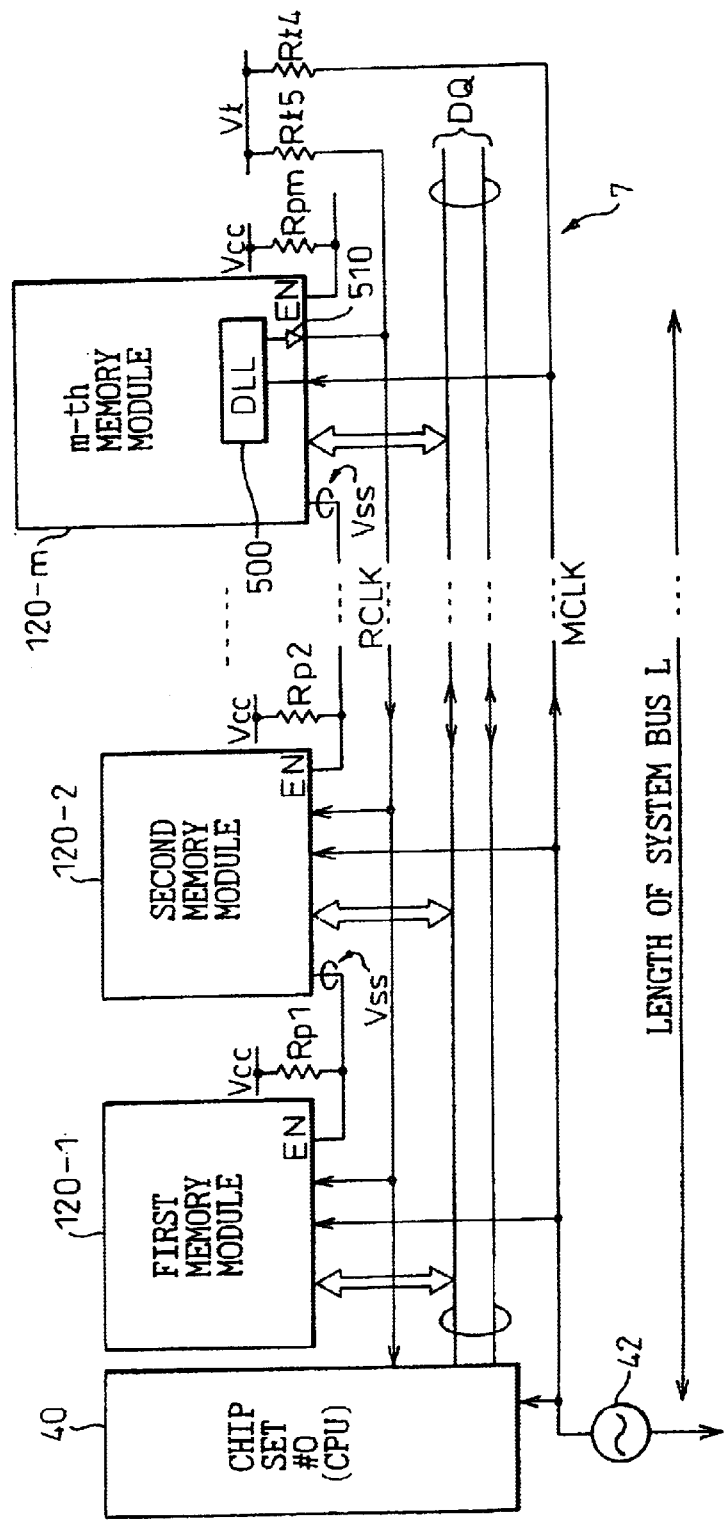
FIG. 3 is a block diagram showing a configuration of a bus system in accordance with the third example of the prior art.
Figure 20:
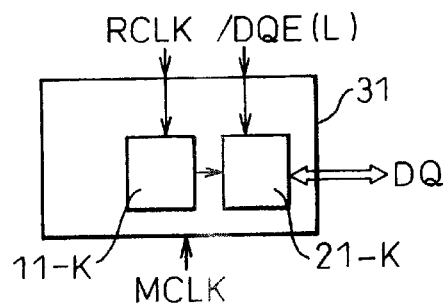
FIG. 20 is a block diagram showing an example of a memory device employed in the other preferred embodiment of the present invention.

In FIG. 5, like the third example of the prior art shown in FIG. 3, one chip set 40 formed with a CPU or the like, a reference signal generator 42, and a plurality of memory devices or memory modules 3-1r to 3-m (substantially corresponding to the plurality of memory modules shown in FIG. 20) are interconnected on the MCLK line, RCLK line, and DQ line included in the system bus 7.

When the plurality of memory devices employed in one preferred embodiment of the present invention are linked directly to the system bus 7, the memory devices are preferably memory devices 30 like the one shown in FIG. 6. The memory device 30 serves as the return clock input/output circuit (See FIG. 4) in accordance with the present invention. The memory device 30 is provided with a return clock input/output circuit (in FIG. 6, a k-th return clock input/output circuit where k denotes any positive integer. $1 \leq k \leq m$) 10-k for inputting or outputting a return clock RCLK generated using the main clock MCLK output from the chip set 40. Furthermore, an output activation circuit (in FIG. 6, a k-th output activation circuit) 20-k for activating output of data in response to a data output enabling signal /DQE (this data output enabling signal may be referred to as an output activation signal), which is generated using the return clock RCLK and active low, corresponds to the output activation circuit in accordance with the present invention (See FIG. 4).

Furthermore, the memory device 30 shown in FIG. 6 is provided with an enabling terminal EN through which an enabling signal is supplied to a memory device. The enabling terminal EN is connected to a high-potential power supply Vcc for supplying a voltage used to drive each semiconductor device in each memory device (or memory module) via an associated one of level adjustment resistors Rp1 to Rpm. Alternatively, the enabling terminal is connected directly to the other low-potential (for example, ground level) power supply Vss. In this case, the enabling signal is used to determine from what memory device (or memory module) the return clock RCLK and data output enabling signal (that is, an output activation signal) /DQE are transmitted during data reading.

Referring back to FIG. 5, the relationship between input and output of the return clock RCLK and data output enabling signal /DQE to and from a plurality of memory devices will be described. In FIG. 5, only the enabling terminal EN of the m-th memory device 3-m located farthest from the chip set 40 is connected to a specific high-potential power supply Vcc via a level adjustment resistor Rpm. The memory devices other than the m-th memory device 3-m are connected directly to the other low-potential power supply Vss. Specifically, only the enabling terminal EN of the m-th memory device 3-m located farthest from the chip set 40 is set to a high level. The enabling terminals EN of the other memory devices are set to a low level. In this case, the m-th memory device 3-m located farthest from the chip set 40 is selected because the enabling terminal EN thereof is set to the high level. The return clock RCLK (that is, a return clock RCLKm) is generated by only the m-th memory device 3-m located farthest from the chip set 40. Moreover, the data output enabling signal /DQE (that is, a data output enabling signal DQEm) that is active low is generated and transmitted onto the RCLK line included in the system bus 7.

Furthermore, the enabling terminals EN of the memory devices other than the m-th memory device 3-$m$ located farthest from the chip set 40 are, as mentioned above, connected to the low-potential power supply Vss, and set to the low level. In this state, the memory devices other than the m-th memory device 3-$m$ receive as inputs the return clock RCLK and data output enabling signal /DQEm which are transmitted from the m-th memory device 3-$m$. Furthermore, if a certain memory device is selected with a chip selection signal /CS or the like by the chip set 40, an output circuit portion of the memory device is activated in response to the data output enabling signal /DQEm. Thus, data (memory data) stored at an address represented by an address signal is output onto the DQ line included in the system bus synchronously with the return clock RCLKm.

In this case, it should be noted that even when a memory device is outputting the return clock RCLKm and data output enabling signal /DQEm, it may be selected by the chip set 40, and that in that case, it uses the return clock RCLKm and data output enabling signal /DQE generated by itself to output memory data synchronously with the signals. In short, when a memory device selected by the chip set 40 is the m-th memory device 3-$m$, the m-th memory device 3-$m$ receives the return clock RCLKm and data output enabling signal /DQEm as inputs. In response to the data enabling signal /DQEm, the output circuit portion of the m-th memory device 3-$m$ is activated, and data is output synchronously with the return clock RCLK. The data output enabling signal /DQEm is synchronous with the return clock RCLKm and flows in the same direction as the return clock RCLKm. In other words, the data enabling signal /DQEm flows toward the data processing unit 4. Incidentally, the clock RCLK0 about to arrive at the chip set 40 may be in phase with the main clock MCLK0.

When a plurality of memory modules is used to construct a bus system, what has been described in relation to the plurality of memory devices will be true. In one embodiment of the present invention, a plurality of memory modules is employed. In this case, a plurality of memory devices 30'-1 to 30'-$m$ (in FIG. 7, first to m-th memory device 30'-1 to 30-$m$) each of which is provided in the form of a module are interconnected on a system bus 7 via a memory module buffer. Preferably, the memory modules are realized with memory modules 35 like the one shown in FIG. 4. The memory module 35 comprises a plurality of memory devices 30'-1 to 30'-$m$ (in FIG. 7, first to m-th memory devices 30'-1 to 30'-$m$), and a memory module buffer 5 (hatched area in FIG. 7) that functions as a memory module buffer for assisting in inputting or outputting a data input/output signal DQ relevant to memory data, a main clock MCLK for use in controlling an address, a return clock RCLK, and a data output enabling signal /DQE that is active low between the plurality of memory devices and chip set 40.

Furthermore, an input/output circuit portion of the memory module buffer 5 preferably includes a return clock input/output circuit portion (not shown in FIG. 7) for inputting or outputting a return clock RCLK generated using the main clock MCLK, which is used to control an address and output from the chip set 40, and an output activation signal generation circuit portion (not shown in FIG. 7) for activating output of data from a memory device included in a memory module in response to a data output enabling signal /DQEM generated using the return clock RCLK output from the return clock input/output circuit portion.

Furthermore, the memory module 35 shown in FIG. 7 is provided with an enabling terminal EN (for example, enabling terminal ENm of the m-th memory module) through which an enabling signal is supplied to the memory module buffer 5. The enabling terminal EN is connected to a high-potential power supply Vcc via an associated one of level adjustment resistors Rp1 to Rpm or connected directly to the other low-potential (for example, ground level) power supply Vss. In this case, the enabling signal is used to determine from what memory module the return clock RCLK and data output enabling signal (that is, an output activation signal) /DQEM should be transmitted during data reading.

Referring back to FIG. 5, the relationship between input and output of the return clock RCLK and data output enabling signal /DQEM to and from the memory module buffers in a plurality of memory modules will be described. In FIG. 5, only an enabling terminal EN (ENm) of an m-th memory module located farthest from the chip set 40 is connected to the specific high-potential power supply Vcc via the level adjustment resistor Rpm and set to a high level. The memory modules other than the m-th memory module are connected directly to the other low-potential power supply Vss and set to a low level. In this case, the m-th memory module located farthest from the chip set 40 is selected because the enabling terminal EN thereof is set to the high level. The return clock RCLK (that is, a return clock RCLKm) is generated using the memory module buffer in the m-th memory module located farthest from the chip see 40. The data output enabling signal /DQEM (that is, a data output enabling signal /DQEMm) that is active low is also generated and transmitted onto the RCLK line included in the system bus 7. In other words, a memory module buffer for use in generating the return clock RCLK and data output enabling signal /DQEM using the main clock MCLK is only one memory module buffer on one system bus which is selected based on an enabling terminal EN.

Furthermore, in FIG. 5, the memory module buffers other than the memory module buffer in the m-th memory module located farthest from the chip set 40 each receive as inputs the return clock RCLKm and data output enabling signal /DQEMm, and generate a local return clock RCLKL (where L stands for local) Moreover, the return clock RCLKL is used to generate a local data output enabling signal /DQEL (where L stands for local) that is active low and activates the output circuit portions of the memory devices 30'-1 to 30'-$m$. The data output enabling signal /DQEL flows in the same direction as the return clock RCLKL synchronously with the return clock RCLKL. In other words, the data output enabling signal /DQEL flows toward the memory devices in each memory module.

However, in the foregoing module type configuration, a memory module buffer in another memory module has the function of fetching the return clock RCLK and data output enabling signal /DQEM and transmitting these signals to the memory devices in the memory module. The local return clock RCLKL and data output enabling signal /DQEL which are produced by buffering the return clock RCLK and data output enabling signal /DQEM in the memory module are output as output signals from the memory module buffer. If necessary, the main clock MCLK and data input/output signal DQ are also output as a local main clock MCLKL (where L stands for local) and data input/output signal DQL (where L stands for local) after they are buffered by the memory module buffer.

Since the memory modules employed in one preferred embodiment of the present invention have the foregoing configuration, all module-type memory devices used as the memory modules need only an input circuit portion for receiving the local return clock RCLKL and data output enabling signal /DQEL that are output signals. Needless to say, the memory devices do not need the enabling terminal EN indicating a source of a return clock and data output enabling signal. FIG. 8 shows an example of a configuration of each memory device 30' in this kind of memory module.

In FIG. 8, each memory device 30' in the memory module includes a return clock input circuit 10'-k for receiving a local return clock RCLKL as an input (in FIG. 8, a k-th return clock input circuit where k denotes any positive integer. $1 \leq k \leq -m$), and an output activation circuit 20'-k (in FIG. 8, a k-th output activation circuit) for activating output of data in response to a local data output enabling signal /DQEL generated using the local return clock RCLKL (the data output enabling signal may be referred to as an output activation signal).

Furthermore, in FIGS. 5, 7, and 8, the memory module buffers other than the memory module buffer located farthest from the chip set 40 each receive as an input a data output enabling signal /DQEMm supplied from the memory module buffer located farthest from the chip set 40. A local data output enabling signal /DQEL generated using the data output enabling signal /DQEMm is used to activate output of data from a memory device selected from among the memory devices in the memory module. Moreover, the data is transmitted to the associated memory module buffer synchronously with the local return clock RCLKL.

Furthermore, in FIGS. 5, 7, and 8, when a memory module located farthest from the chip set 40 is selected by the chip set 40, the plurality of memory devices 30'-1 to 30'-m in the memory module each receive as inputs the local return clock RCLKL and data output enabling signal /DQEL which are generated using the memory module buffer in the memory module. Moreover, output of data is activated in response to the data output enabling signal /DQEL. The data is transmitted to the memory module buffer synchronously with the return clock RCLKL.

Furthermore, in FIGS. 5, 7, and 8, when a memory module located farthest from the chip set 40 is selected by the chip set 40, the plurality of memory devices 30'-1 to 30'-m in the memory module each receive as inputs the return clock RCLKL and data output enabling signal /DQEL which are generated using the memory module buffer in the memory module. Moreover, output of data is activated in response to the data output enabling signal /DQEL. The data is transmitted to the memory module buffer synchronously with the return clock RCLKL.

In other words, even in the foregoing module-type configuration, a memory module buffer in a memory module that is outputting the return clock RCLK and data output enabling signal /DQEM (for example, a memory module buffer in the m-th memory module located farthest from the chip set 40) can output the return clock RCLK and data output enabling signal /DQEM to a memory module buffer within the same memory module. When a memory device in a memory module that is outputting the return clock RCLK and data output enabling signal /DQEM is selected by the chip set 40, the memory device can output memory data according to the same timing as a memory device in another module.

When a data transfer memory employed in one embodiment of the present invention shown in FIGS. 5 to 8 is composed of a plurality of memory devices or a plurality of memory modules such as a plurality of module-type memory devices, the data output enabling signal /DQE or /DQEM flows in the same direction as the return clock RCLK. However large a system bus length L may be, any memory device or memory module on the system bus 7 can transfer data to the chip set 40 for the same access time.

Furthermore, according to one embodiment of the present invention shown in FIGS. 5 to 8, the return clock RCLK and data output enabling signal /DQE or /DQEM can each be set to any phase by a DLL or the like included in a memory module buffer in a memory device or memory module.

Furthermore, according to one preferred embodiment of the present invention shown in FIGS. 5 to 8, the input circuit portion of the chip set 40, and the input circuit portions of the output activation circuits in the memory devices or memory modules are activated only for a given time in response to the data output enabling signal /DQE or /DQEM. Consequently, the power consumption required by the chip set 40 or the output activation circuit in each memory device or memory module can be saved.

Figure 9:
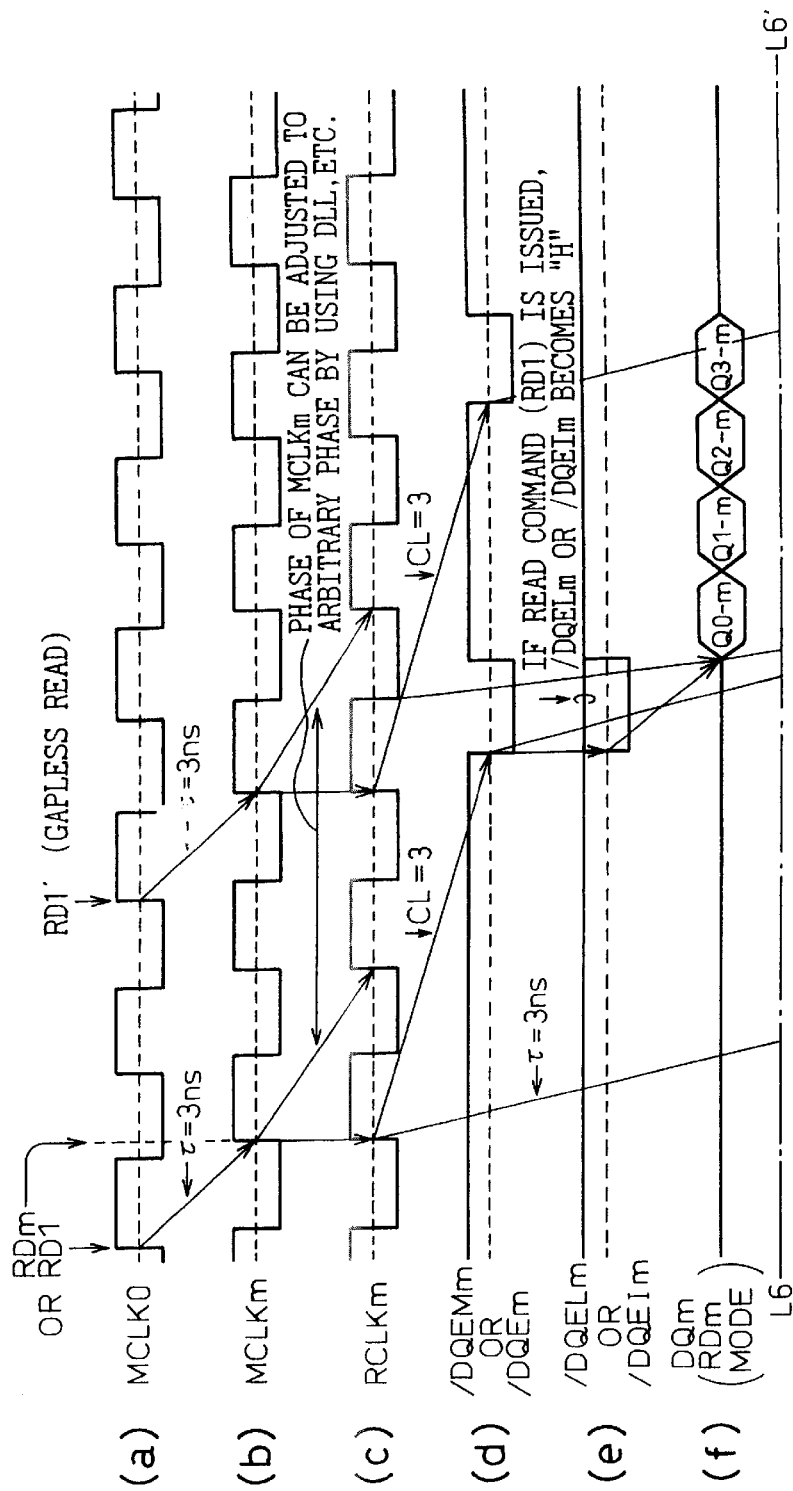
FIG. 9 is a timing chart No. 1 showing waveforms of signals to be produced for performing a gap-less read operation on different memory devices or memory modules under first conditions in one preferred embodiment of the present invention.
Figure 10:
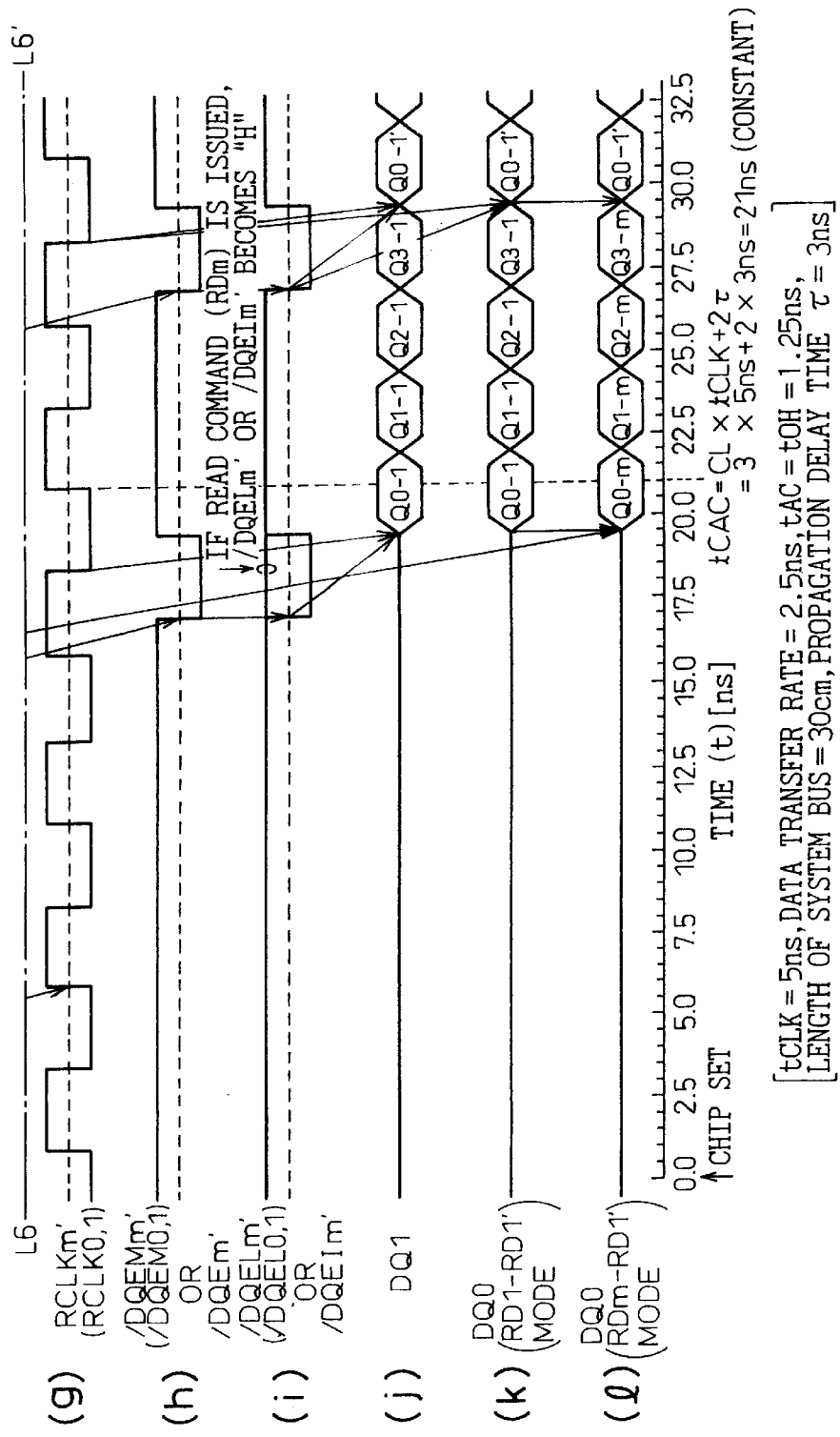
FIG. 10 is a timing chart No. 2 showing waveforms of signals to be produced for performing a gap-less operation on different memory devices or memory modules under the first conditions in one preferred embodiment of the present invention.

FIGS. 9 and 10 are timing charts Nos. 1 and 2 showing waveforms of signals to be produced for performing a gapless read operation on different memory devices or memory modules under first conditions.

Now, the operation of one embodiment of the present invention for reading data from a certain memory device or memory module and then continuously reading data from another memory device or memory module (that is, a gapless read operation or an interleave operation) will be described with reference to the timing charts of FIGS. 9 and 10.

In this case, a memory device or memory module formed with a double data rate synchronous DRAM (DDR SDRAM) that operates synchronously with a clock having a clock frequency of 400 MHz shall operate under the conditions that a column access strobe signal (CASS) latency CL is 3, a length in bits of data to be read is 4 bits, and a 2×rule is observed. The CASS latency CL refers to the number of clock cycles that pass until a data output enabling signal is output after a read instruction is issued from a CPU or the like. For example, when CL equals to 3, the data output enabling signal is output when three clock cycles have passed after a data read instruction is issued. Furthermore, assume that a clock rate CLK that is an inverse number of the clock frequency is 5 ns (ns denotes $10^{-9}$ sec), a data transfer rate is 2.5 ns, a phase shift time tAC=tOH is approximately 1.25 ns, a system bus length L is 30 cm, and a propagation delay time τ is 3 ns.

Furthermore, waveforms of signals to be produced on the assumption that after data is read from a memory device or memory module located closest to the chip set, data is read continuously from the memory device or memory module located at the same position are compared with those to be produced on the assumption that after data is read from a memory device or memory module located farthest from the chip set, data is read continuously from the memory device located closest to the chip set.

According to one preferred embodiment of the present invention, as shown in FIG. 9(a), a main clock MCLK0 generated by the chip set is input to a memory device or memory module located farthest from the chip set over the MCLK line. As shown in FIGS. 9(b) ad 9(c), the phase of the main clock MCLKm input from the chip set to the memory device or memory module located farthest from the chip set is adjusted to any value by means of a DLL or the like. Thereafter, the resultant clock is output as a return clock RCLKm. Meanwhile, a data output enabling signal stemming from the return clock RCLKm (that is, an output activation signal /DQEm or /DQEMm) is output (FIG. 9d).

When memory devices are employed, the data output enabling signal /DQEm is input to all the memory devices over the system bus. A data output enabling signal /DQEIm is then generated as an internal signal of each memory device (FIG. 9e). Furthermore, data (Q0-m to Q3-m) is output from a memory device, which is selected with a read instruction (RDm) sent from the chip set (that is, the m-th memory device located furthest from the chip set), synchronously with the return clock RCLKm and data output enabling signal /DQEIm (FIG. 9f). When another memory device, for example, a memory device located closest to the chip set (first memory device) is selected as an output device, which should execute a gap-less read operation, with another read instruction (RDI') issued from the chip set, a data output enabling signal /DQEIm' (where m equals to 1) is generated synchronously with the data output enabling signal /DQEm' (corresponding to the data output enabling signal /DQFm) (FIGS. 10h and 10i).

Furthermore, a monostable multivibrator (one-shot multivibrator) or the like is used to drive a data output enabling signal /DQEIm (where m=1) generated by a selected memory device (first memory device) to low only for one clock duration. Data output enabling signals generated by the other unselected are driven high. The output circuit portion of the selected memory device alone (first memory device) is activated in response to the data output enabling signal /DQEIm'. Current data (Q0-1' to Q3-1') is output successively to previous data (Q0-m to Q3-m) synchronously with the return clock RCLK (RCLKm) (RDm–RD1 mode) (FIG. 10Bl) In this case, an impedance to transfer of the return clock RCLK agrees with an impedance to transfer of the data output enabling signal /DQE and data input/output signal DQ. Thus, whichever of memory devices is accessed by the chip set, first data can be received in a certain time (an access time tCAC=21 ns (CL×tCLK+2τ= 3×5 ns+2×3 ns)) after issuance of a read instruction. After the first data is received by the chip set, the chip set can receive data continuously at high speed.

Furthermore, after data is read from a memory device located closest to the chip set, even if data is read continuously from the memory device located at the same position, first data can be received in a certain time (access time tCAC=21 ns) after issuance of a read instruction (FIGS. 10j and 10k). In this case, data (Q0-1' to Q3-1') in the same memory device is output successively to previous data (Q0-1 to Q3-1) (RD1–RD1' mode).

On the other hand, when memory modules are employed, the data output enabling signal /DQEMm is input to the memory module buffers in all the memory modules over the system bus. A local data output enabling signal /DQELm is generated as an internal signal of the plurality of memory devices in each memory module (FIG. 9e). Moreover, a selected memory module, that is, the m-th memory module located farthest from the chip set outputs data (Q0-m to Q3-m) synchronously with the return clock RCLKm and data output enabling signal /DQELm (FIG. 9f). When another memory module, for example, a memory module located closest to the chip set (first memory module) is selected as an output module, which should execute a gap-less read operation, with another read instruction (RD1') issued from the chip set, a data output enabling signal /DQELm' (where m=1) is generated synchronously with the data output enabling signal /DQEMm' (corresponding to the data output enabling signal /DQEMm) (FIGS. 10n and 10i).

An operation to be carried out after a memory module located closest to the chip set is selected and the data output enabling signal /DQELm' is generated is substantially identical to the aforesaid operation to be carried out when memory devices are employed (FIGS. 10j to 10k). The description of the operation will therefore be omitted.

Figure 11:
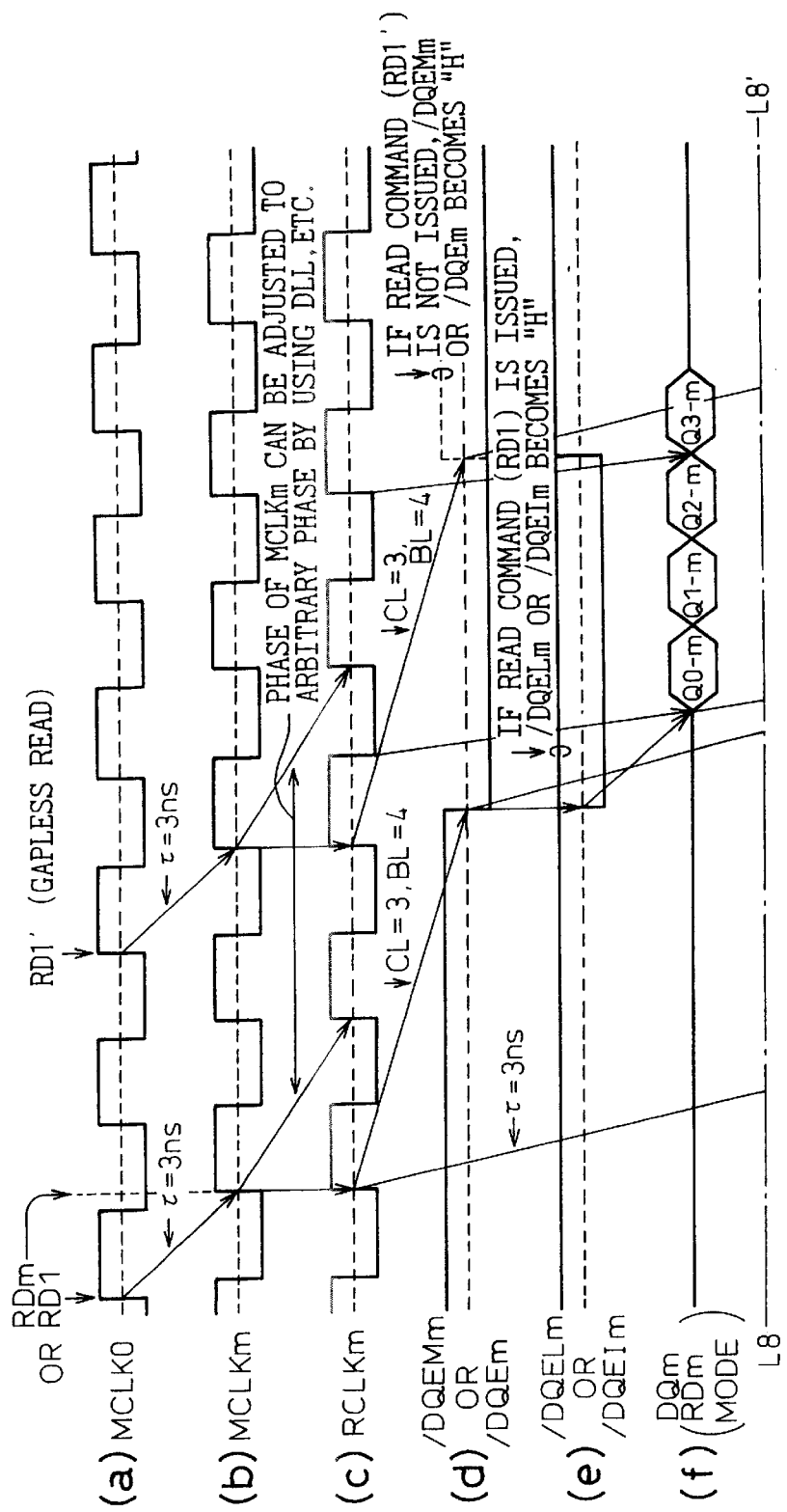
FIG. 11 is a timing chart No. 1 showing waveforms of signals to be produced for performing a gap-less read operation on different memory devices or memory modules under second conditions in one preferred embodiment of the present invention.
Figure 12:
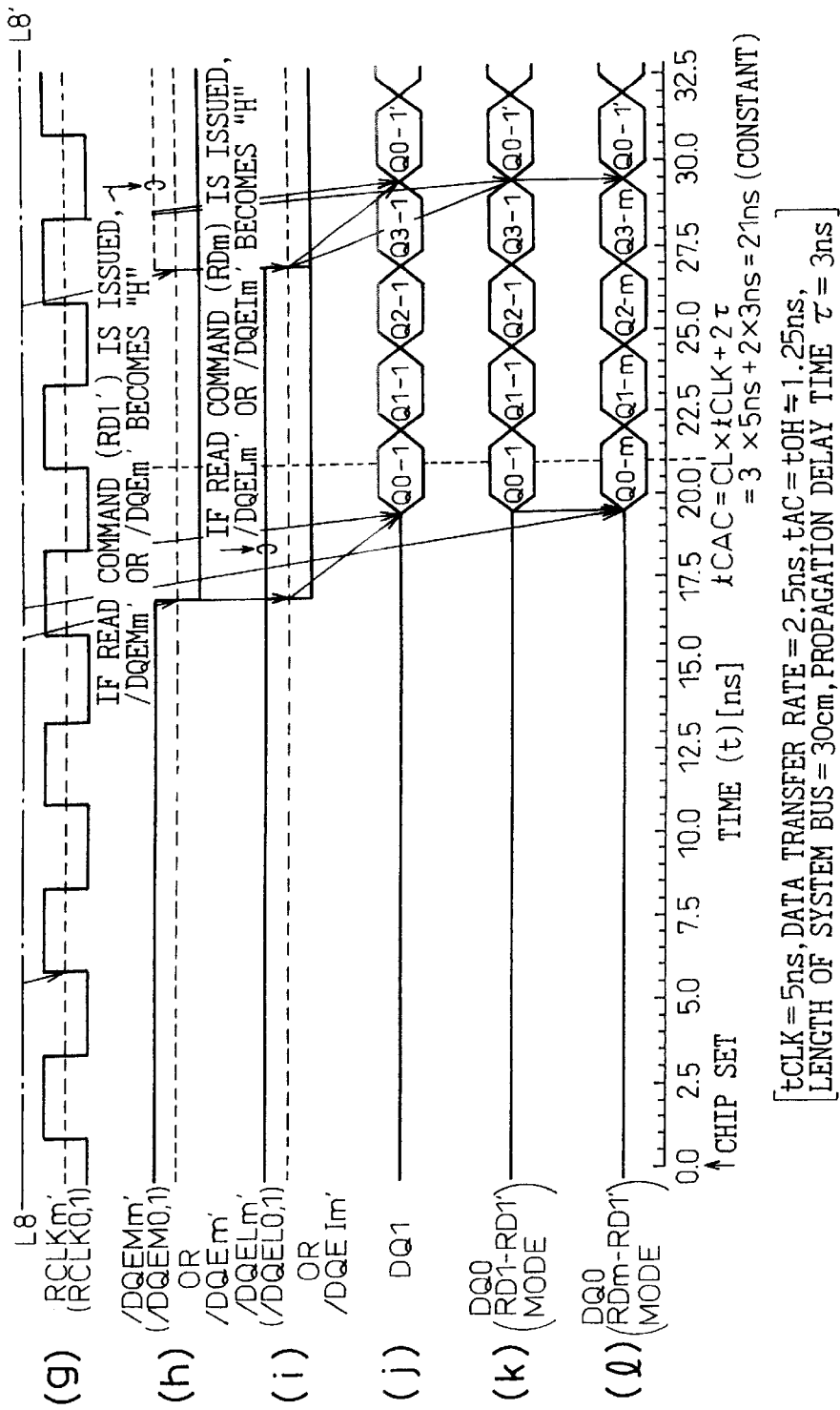
FIG. 12 is a timing chart No. 2 showing waveforms of signals to be produced for performing a gap-less operation on different memory devices or memory modules under the second conditions in one preferred embodiment of the present invention.

FIGS. 11 and 12 are timing charts Nos. 1 and 2 showing waveforms of signals to be produced for performing a gap-less read operation on different memory devices or memory modules under second conditions in one preferred embodiment of the present invention.

FIGS. 11 and 12 show waveforms, like the waveforms shown in FIGS. 9 and 10, of signals to be produced on the assumption that after data is read from a certain memory device or memory module, data is read continuously from another memory device or memory module.

In this case, a monostable multivibrator or the like is not used to activate a data output enabling signal /DQEIm, /DQEIm', /DQELm, or /DQELm' generated by a selected memory device or memory module only for one clock duration (to drive the data output enabling signal to low). Instead, the data output enabling signal is activated during a period during which data is output. This is a difference from the operation indicated with the waveforms shown in FIGS. 6 and 7 (FIGS. 11e and 12i).

The other conditions and the operation of the bus system are substantially identical to those indicated by the waveforms in FIGS. 9 and 10. The description of the conditions and operation will be omitted.

Figure 13:
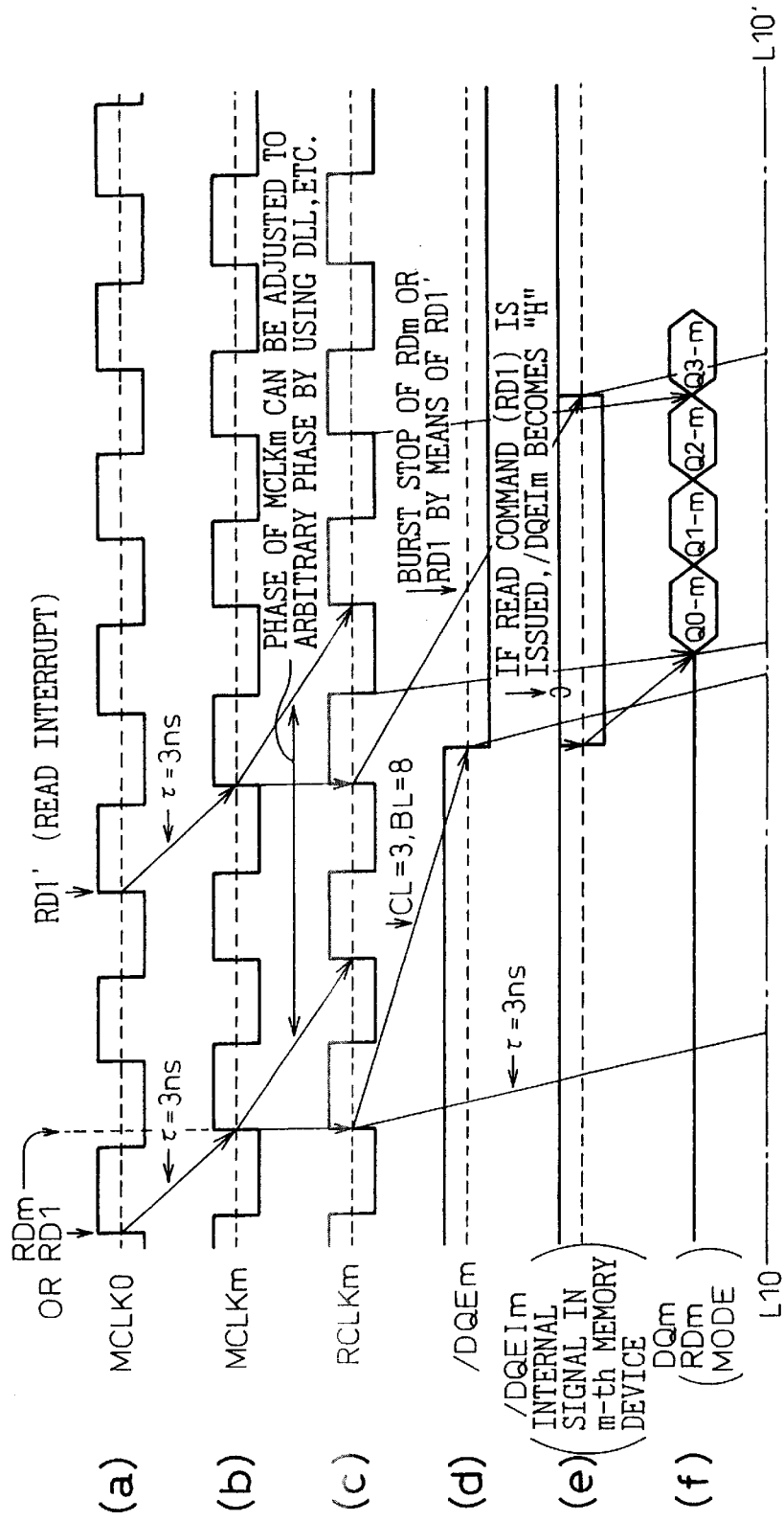
FIG. 13 is a timing chart No. 1 showing waveforms of signals to be produced for performing a gap-less read operation on different memory devices or memory modules under third conditions in one preferred embodiment of the present invention.
Figure 14:
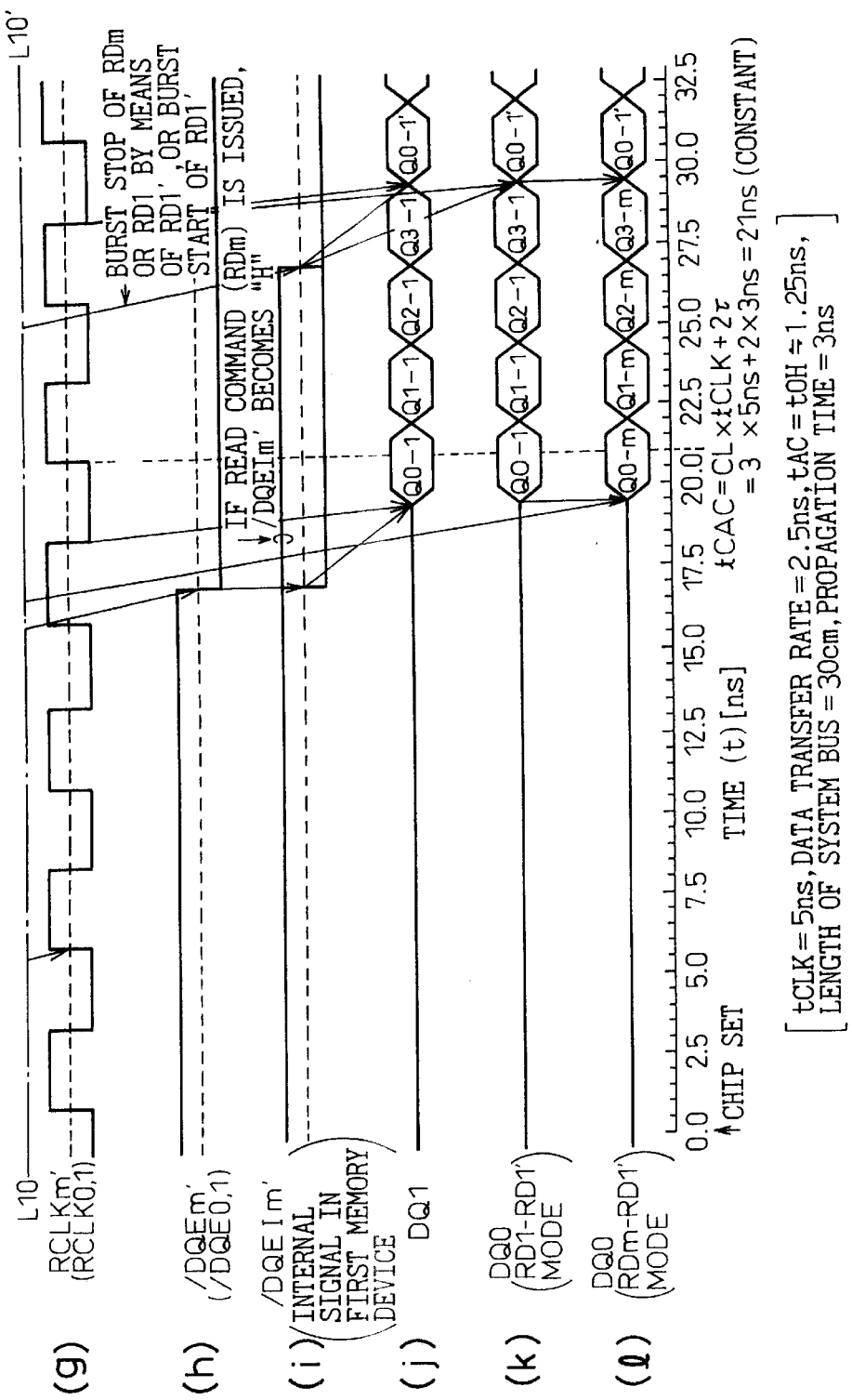
FIG. 14 is a timing chart No. 2 showing waveforms of signals to be produced for performing a gap-less read operation on different memory devices or memory modules under the third conditions in one preferred embodiment of the present invention.

FIGS. 13 and 14' are timing charts Nos. 1 and 2 showing waveforms of signals to be produced for performing a gap-less read operation on different memory devices under third conditions according to one preferred embodiment of the present invention.

Shown are waveforms of signals to be produced for reading data from another memory device by carrying out a read interrupt operation during reading of data from a certain memory device.

In this case, burst transmission is stopped in a memory device from which data is being read in response to a read instruction (RDm) issued from the chip set (for example, a memory device located farthest from the chip set). A data output enabling signal /DQEIm' generated in the memory device is thus inactivated (FIG. 13e). In contrast, burst transmission is started in a memory device (for example, a memory device located closest to the chip set) selected during a read interrupt operation (RD1'). The data output enabling signal /DQEIm' (where m=1) generated in the memory device is thus activated (FIG. 14i).

The other conditions and the operation of the bus system are substantially identical to those indicated by the waveforms shown in FIGS. 9 and 10. The description of the conditions and operation will be omitted.

Even when data is read from another memory device by carrying out a read interrupt operation as indicated in FIGS. 13 and 14, similar to when data is read from different memory devices by carrying out a gap-less read operation as indicated in FIGS. 9 to 12, on whichever of memory devices the chip set performs a read interrupt operation, first data can be received in a certain time after issuance of a read instruction (herein, in an access time tCAC=21 ns). After the first data is received by the chip set, subsequent data can be received continuously at high speed.

FIGS. 15 to 18 show waveforms of signals produced in the DQ strobe mode adopted by the second example of a prior art and the return clock mode adopted by the third example of a prior art. Referring to the drawings, a difference between data transfer to be achieved by reading data according to the embodiment of the present invention and data transfer to be achieved by reading data in a conventional mode will be clarified.

Figure 15:
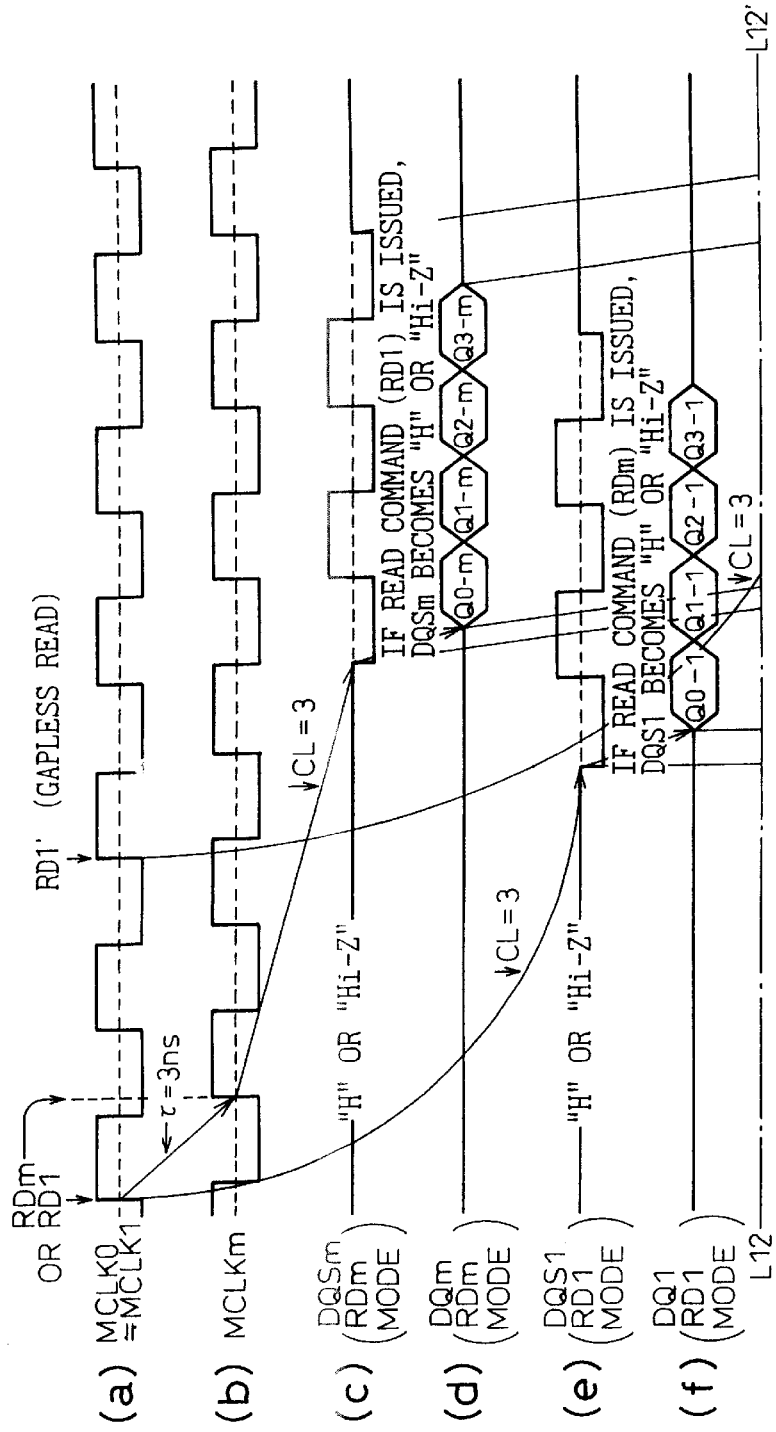
FIG. 15 is a timing chart No. 1 showing waveforms of signals to be produced for performing a gap-less read operation on different memory devices in the known DQ strobe mode.
Figure 16:
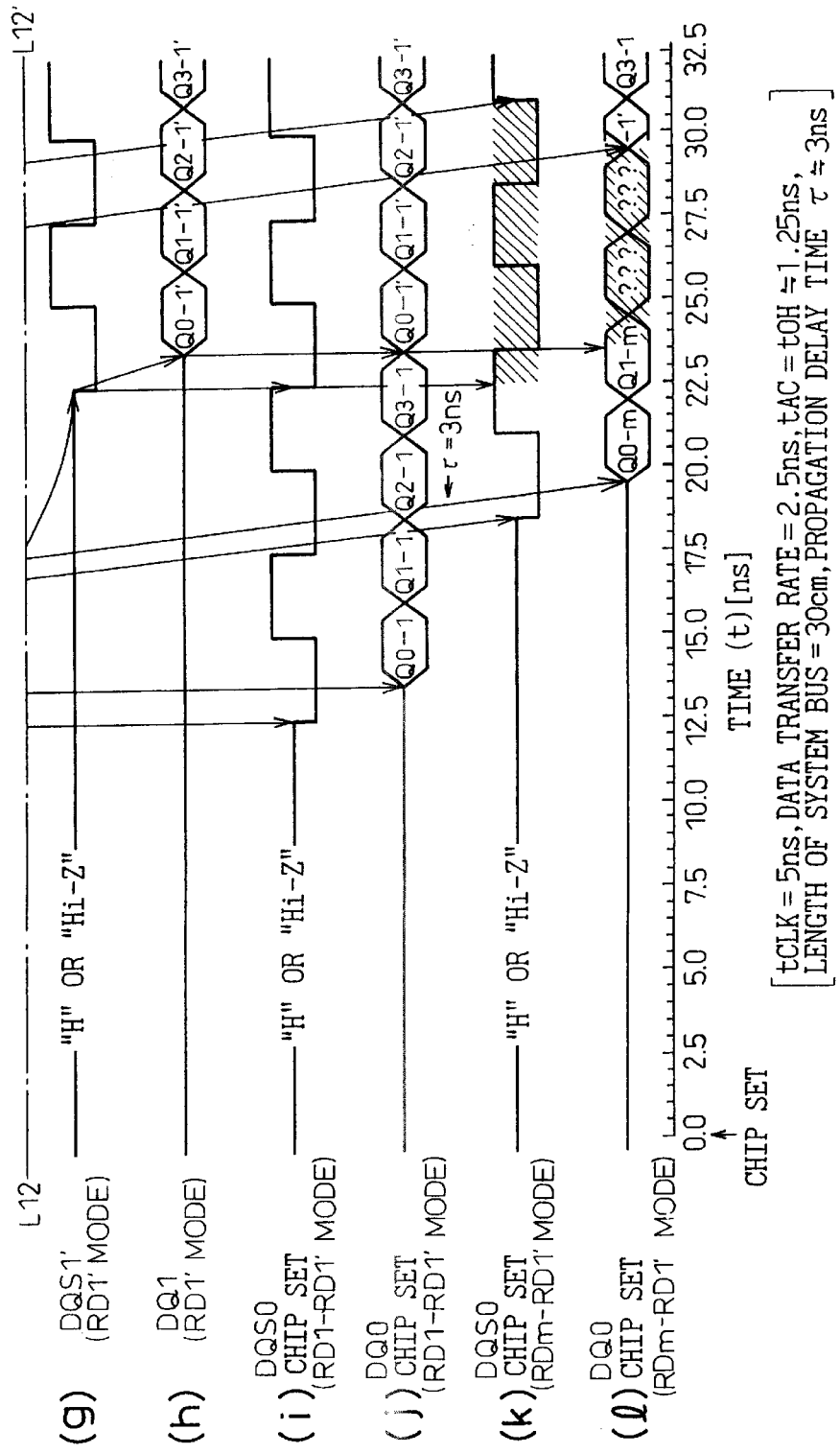
FIG. 16 is a timing chart No. 2 showing waveforms of signals to be produced for performing a gap-less read operation on different memory devices in the known DQ strobe mode.

FIGS. 15 and 16 are timing charts Nos. 1 and 2 showing waveforms of signals to be produced for performing a gap-less read operation on different memory devices in the conventional DQ strobe mode.

The illustrated signals are produced when, after data is read from a certain memory device or memory module, data is read from another memory device or memory module, that is, when an interleave operation is carried out. However, it is assumed that conditions including a clock rate and data transfer rate are identical to those set in the aforesaid embodiment.

Figure 1:
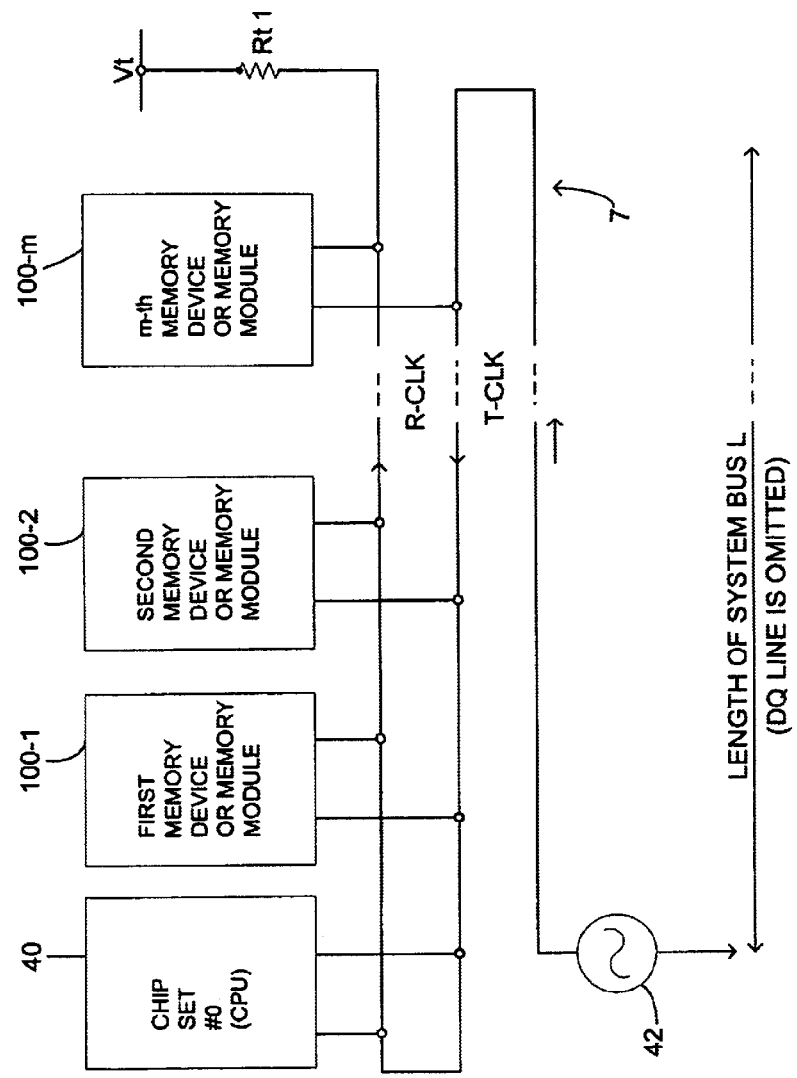
FIG. 1 is a block diagram showing a configuration of a bus system in accordance with the first example of the prior art.
Figure 2:
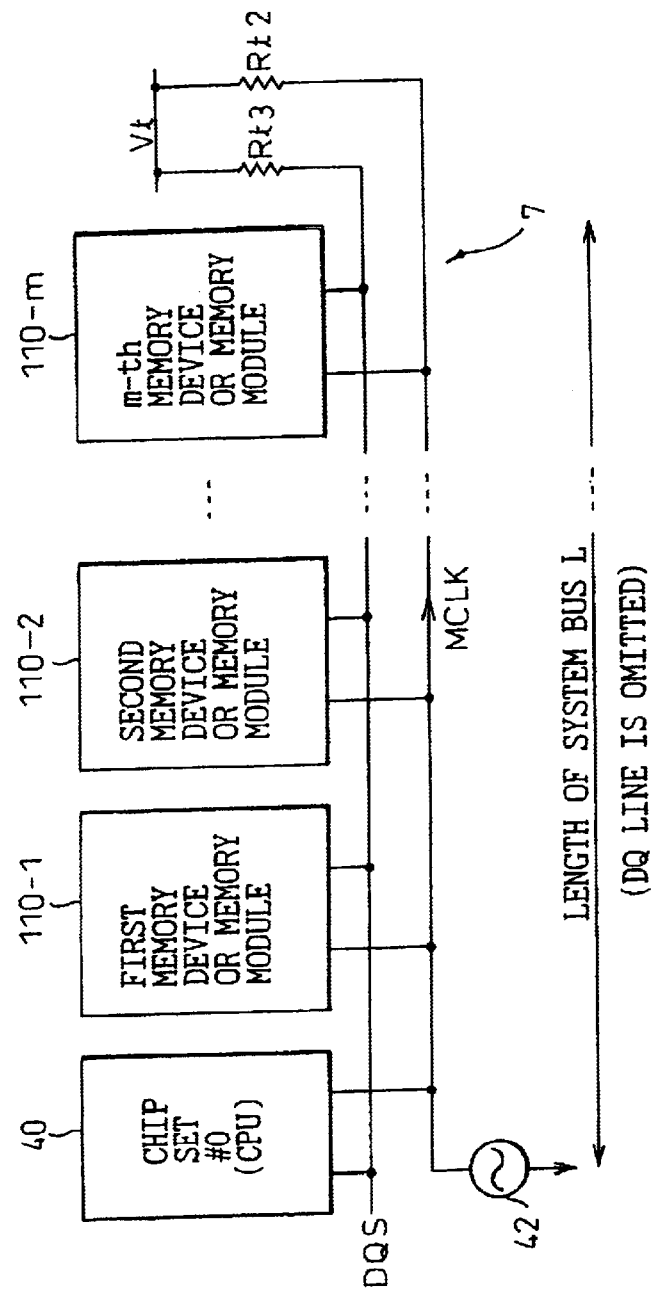
FIG. 2 is a block diagram showing a configuration of a bus system in accordance with the second example of the prior art.

In a bus system adopting the conventional DQ strobe mode, as described with reference to FIG. 2, a signal delay time τ dependent on a system bus length L arises. Consequently, the time necessary for a memory device to receive a read instruction instructing reading of data, and the time is necessary for the chip set to receive data output from a memory device synchronously with any of DQ strobes DQS1 to DQSm output from the memory device vary depending on the position of the memory device (FIGS. 15a to 16h).

It is assumed that data is read from a given memory device (for example, a memory device located farthest from the chip set) in response to a read instruction (RDm) sent from the chip set. Thereafter, a gap-less read instruction (RD1') is issued for another memory device (for example, a memory device located closest to the chip set) (a DQ strobe is high or affected by a high impedance ("Hi-z")). In this case, since the distances of the memory devices from the chip set are mutually different, access time tCAC required for the memory devices becomes different. As a result, as shown in FIGS. 16k and 16l, even when an attempt is made to execute an interleave operation, the memory devices whose distances from the chip set are mutually different cannot be arbitrated smoothly. This results in a bus collision as indicated by a hatched area in FIG. 16 Consequently, it becomes difficult to transfer data at a high speed. Incidentally, after data is read from the memory device located closest to the chip set, data may be read successively from the memory device located at the same position. In this case, a difference in access time tCAC will not arise. Therefore, when a certain time has elapsed after issuance of a read instruction, data can be transferred successively (FIGS. 16i and 16j).

Figure 17:
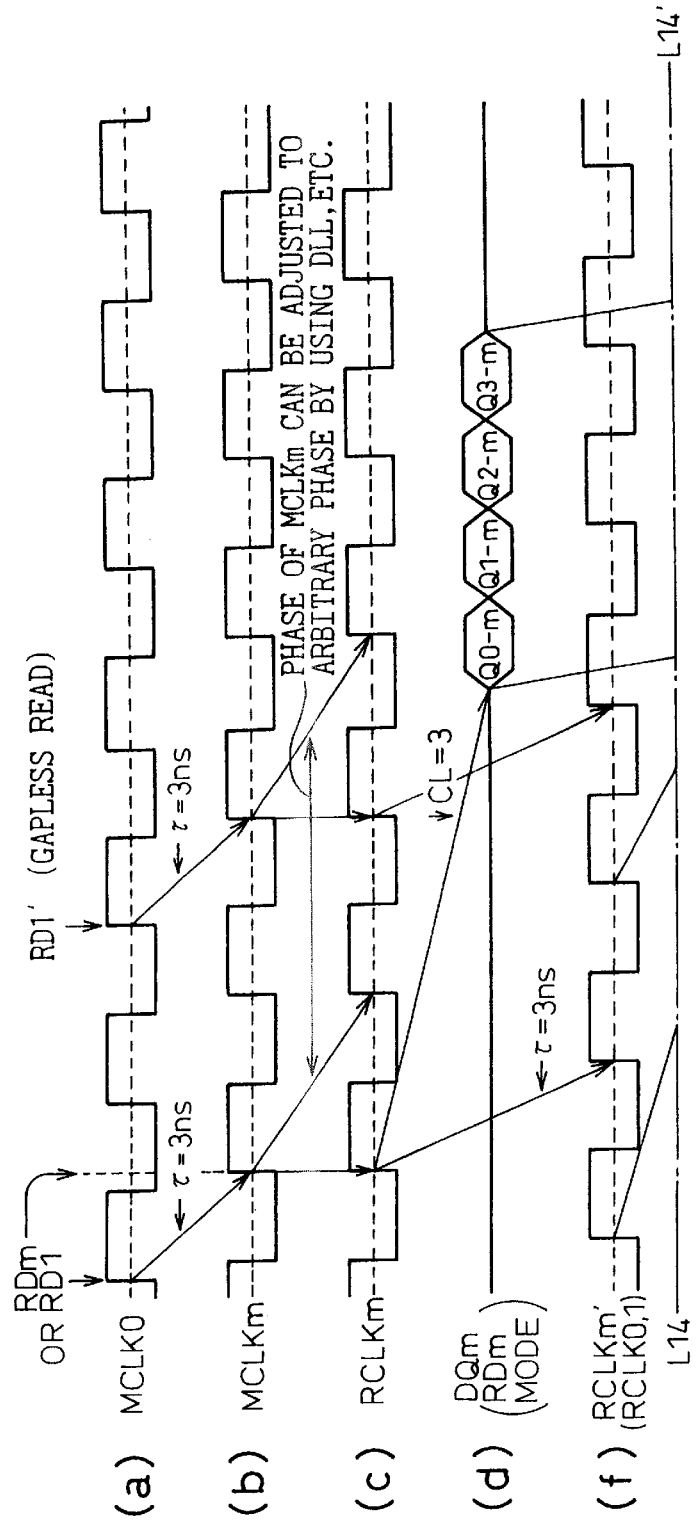
FIG. 17 is a timing chart No. 1 showing waveforms of signals to be produced for performing a gap-less read operation on different memory devices in the known return clock mode.
Figure 18:
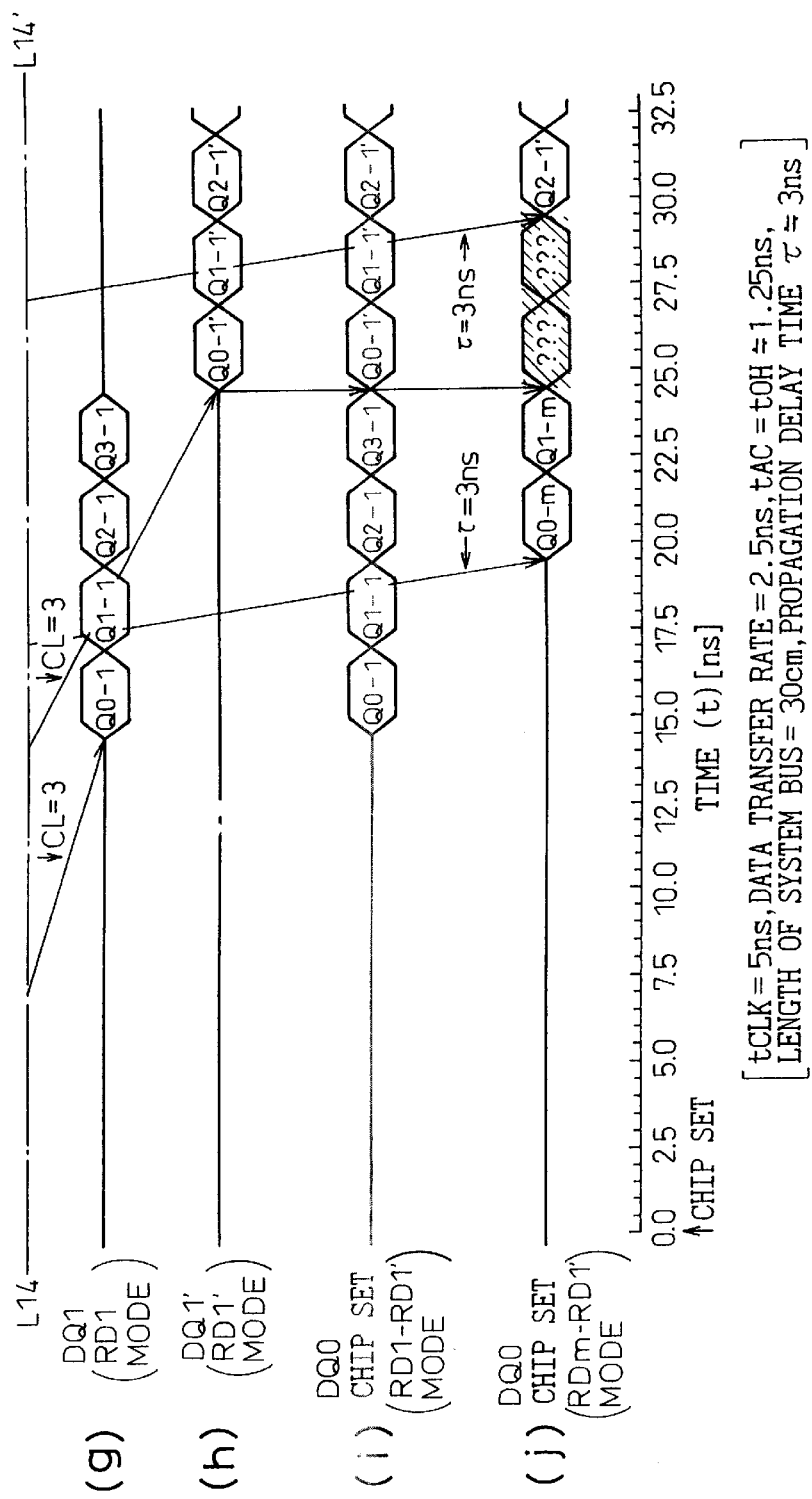
FIG. 18 is a timing chart No. 2 showing waveforms of signals to be produced for performing a gap-less read operation on different memory devices in the known return clock mode.

FIGS. 17 and 18 are timing charts Nos. 1 and 2 showing waveforms of signals to be produced for performing a gap-less read operation on different memory devices in the conventional return clock mode.

The illustrated signals are produced when, after data is read from a certain memory device or memory module, data is read continuously from another memory device or memory module, that is, when an interleave operation is executed. However, it is assumed that conditions including a clock rate and data transfer rate are identical to those set in the aforesaid embodiment.

In a bus system adopting the conventional return clock mode, as described with reference to FIG. 3, when a signal delay time τ dependent on a system bus length L becomes equal to or longer than a half of a data transfer time, there arises a difference in access time between data in a memory module located closest to the chip set and data in a memory module located farthest therefrom (FIGS. 17a to 17f).

After data is read from a certain memory device (for example, a memory device located farthest from the chip set), a gap-less read instruction may be issued for another memory device' (for example, a memory device located farthest from the chip set). In this case, since the distances of the memory devices from the chip set are considerably different from each other, access time tCAC required for the memory devices becomes mutually different. Consequently, as shown in FIGS. 18g, 18h, and 18i, even when an attempt is made to execute an interleave operation, the memory devices whose distances from the chip set are mutually different cannot be arbitrated smoothly. This results in a bus collision as indicated by a hatched area in FIG. 18. It therefore becomes difficult to transfer data at high speed. Incidentally, after data is read from a memory device located farthest from the chip set, when data is read from the memory device located at the same position, a difference in access time tCAC will not arise. When a certain time has elapsed after issuance of a read instruction, data can be transferred successively (FIG. 18i).

Figure 19:
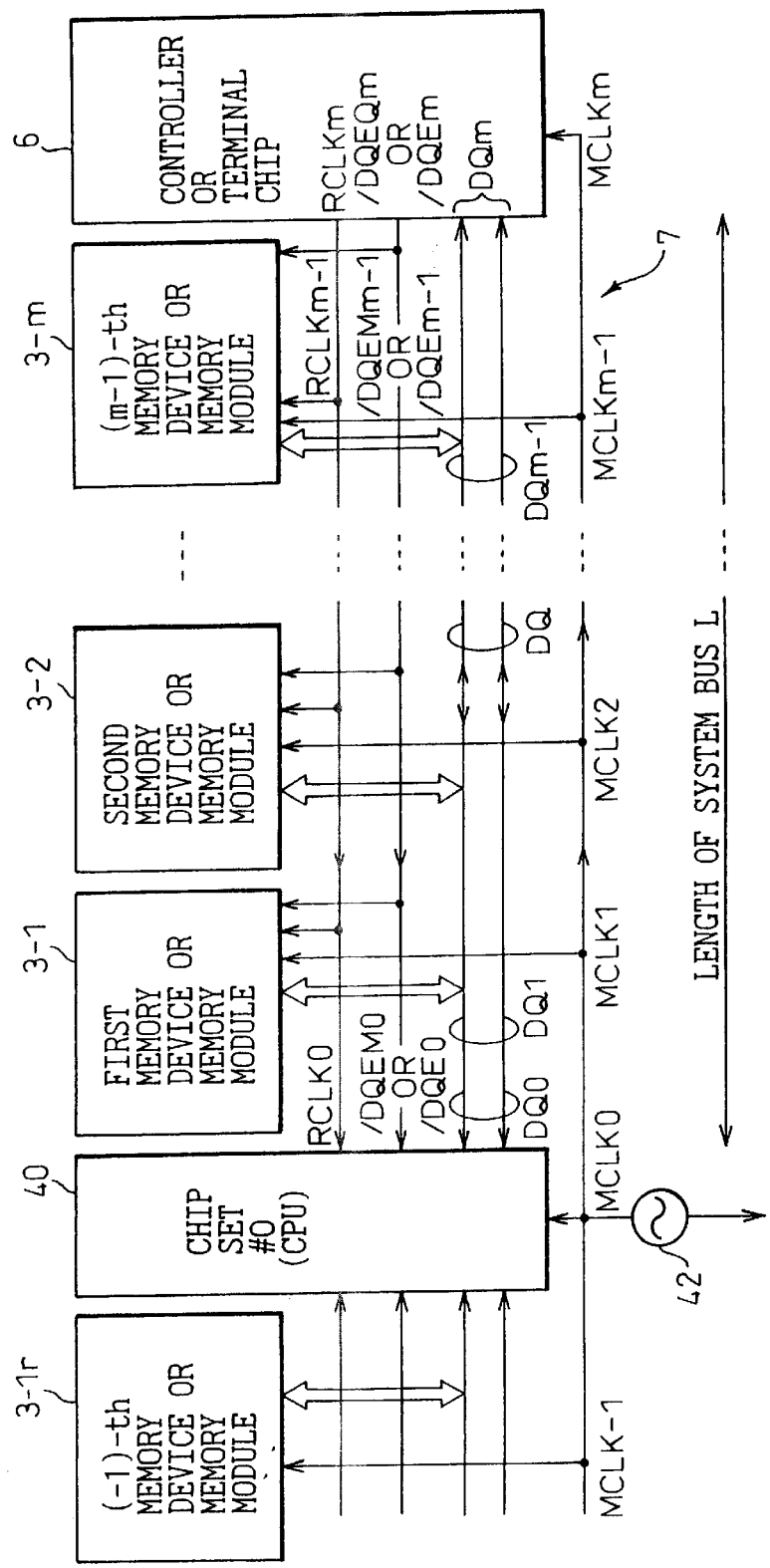
FIG. 19 is a block diagram showing a configuration of a bus system in accordance with the other preferred embodiment of the present invention.
Figure 21:
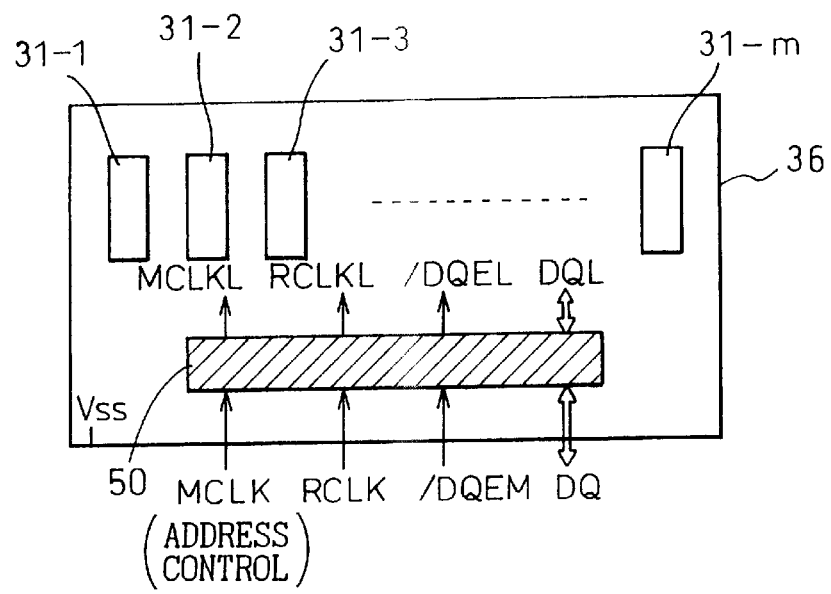
FIG. 21 is a block diagram showing an example of a memory module buffer employed in the other preferred embodiment of the present invention.

FIG. 19 is a block diagram showing a configuration of a bus system in accordance with the other embodiment of the present invention. FIG. 20 is a block diagram showing an example of a memory device employed in the other embodiment of the present invention. FIG. 21 is a block diagram showing an example of a memory module buffer employed in the other embodiment of the present invention.

In FIG. 19, unlike FIGS. 5 to 8 concerning one embodiment of the present invention, a controller chip having a controller (or terminal chip) 6 for controlling a plurality of memory devices or memory modules is located farthest from the chip set 40 (that is, at a position at which the m-th memory device or memory module is located). When a plurality of memory devices are an object of control, the controller 6 generates a return clock RCLKm and data output enabling signal /DQEm. When a plurality of memory modules are an object of control, the controller 6 generates a return clock RCLKm and data output enabling signal /DQEMm. In this case, the controller chip having the controller 6 is provided with the function of generating the return clock and data output enabling signal. Whichever of the memory devices and memory modules is an object of control, an enabling terminal EN, to help determine from what memory device or memory module the return clock and data output enabling signal are transmitted, becomes unnecessary.

Furthermore, in FIG. 19, bus lines constituting a system bus 7 include an MCLK line for use in transferring a main clock MCLK sent from a chip set (chip set #0) 40 such as a CPU to (−1)-th to (m-1)-th memory devices or memory modules 3-1r, 3-1, etc., and 3-m-1 (a plurality of memory devices or memory modules 3-1r to 3-m-1), and an RCLK line for use in transferring a return clock RCLK sent from the plurality of memory modules 3-1r to 3-m-1 to the chip set 40 during output of data.

The components other than the controller 6 shown in FIG. 19 are substantially identical those shown in FIG. 5. The description of the components will therefore be omitted.

On the other hand, in FIG. 19, each memory device or memory module receives as inputs a return clock RCLKm and data output enabling signal /DQEm or /DQEMm which are generated by the controller 6. The memory device or memory module then generates a return clock RCLK, and uses the return clock to generate a data output enabling signal /DQE or /DQEM for activating the output circuit portion of each memory device. The data output enabling signal /DQE or /DQEM is synchronous with the return clock RCLK, and flows in the same direction as the return clock. In other words, the data output enabling signal /DQE or /DQEM flows toward the chip set 40.

The plurality of memory devices employed in the other embodiment of the present invention are, preferably, formed with memory devices 31 like the one shown in FIG. 20. The memory device 31 is provided with a return clock input circuit 11-*k* (in FIG. 29, a k-th return clock input circuit) for inputting a return clock RCLK generated using the main clock MCLK output from the chip set 40. Furthermore, the memory device is provided with an output activation circuit 21-*k* (in FIG. 20, a k-th output activation circuit) for receiving a data output enabling signal /DQE (or /DQEL) generated using the return clock RCLK and for activating output of data in response to the data output enabling signal /DQE. The configuration of the memory device 31 including the return clock input/output circuit 11-*k* and output activation circuit 21-*k* is fundamentally identical to that of the memory device 30 shown in FIG. 3. A difference from the configuration of the memory device shown in FIG. 3 lies in the points that the enabling terminal EN becomes, as mentioned above, unnecessary and that only an input circuit portion such as a return clock input circuit is needed and an output circuit portion is not needed.

By contrast, the plurality of memory modules employed in the other embodiment of the present invention are, preferably, formed with memory modules 36 having a memory module buffer (hatched area in FIG. 21) like the one shown in FIG. 21. The memory module 36 includes a plurality of memory devices 31-1 to 31-*m*, and a memory module buffer 50 that functions as a memory module buffer for inputting and outputting a data input/output signal DQ relevant to data and other signals.

The configuration of the memory module 36 is fundamentally identical to that of the memory module 35 shown in FIG. 7. A difference from the memory module shown in FIG. 7 lies in a point that the enabling terminal EN is, as mentioned above, unnecessary.

According to the other embodiment of the present invention, a necessity for the enabling terminal EN indicating a source of a return clock RCLK is obviated. This results in the circuitry simpler than the aforesaid circuitry of one embodiment of the present invention.

As described so far, according to the typical embodiment of a present invention, in a data transfer memory, first, a memory device or memory module and controller located at a give position generate a return clock, and use the return clock to generate a data output enabling signal. The data output enabling signal flows in the same direction as the return clock. However large a system bus length may be, even when a data transfer rate is so high that a data transfer time becomes equal to or shorter than a half of a signal delay time, data can be transferred from any memory device or memory module on a system bus to a CPU or the like for the same access time. Besides, various kinds of data items can be transferred at high speed continuously.

Furthermore, according to the typical embodiment of the present invention, in a data transfer memory, second, a memory device or memory module located farthest from a CPU or the like generates a return clock, and uses the return clock to generate a data output enabling signal. A variation in signal delay time dependent on a system bus length will therefore not occur. An efficiency of the whole system can be improved.

Furthermore, according to the typical embodiment of the present invention, in a data transfer memory, third, memory devices or memory modules other than a memory device or memory module located farthest from a CPU or the like receive a data output enabling signal supplied from the latter memory device or memory module. The memory devices or memory modules activate output of data in response to the data output enabling signal, and output data synchronously with a return clock. Data can therefore be transferred from any memory device or memory module on a system bus to the CPU or the like for the same access time.

Furthermore, according to the typical embodiment of the present invention, in a data transfer memory, fourth, a return clock and data output enabling signal can each be set to any phase. Occurrence of a signal delay dependent on a system bus length can therefore be prevented.

Furthermore, according to the typical embodiment of the present invention, in a data transfer memory, fifth, the input circuit portion of each memory device or memory module is activated only for a given time in response to a data output enabling signal. The power consumption required by the whole system can therefore be reduced.

What is claimed:

1. A memory device located at the farthest position from a data processing unit and receiving a main clock from the data processing unit, comprising:

a return clock generating circuit for generating a return clock in response to the main clock and for transmitting the return clock to the data processing unit and other memory devices; and a data output enable signal generating circuit for generating a data output enable signal in response to the return clock and for transmitting the data output enable signal to the data processing unit and other memory devices.

2. The memory device as claimed in claim 1, wherein the memory device generates the return clock and the data output enable signal in response to an enable signal.

3. The memory device as claimed in claim 1, wherein the return clock generating circuit includes a delayed lock loop circuit for adjusting a phase of the return clock.

4. The memory device as claimed in claim 1, further comprising:

a data output circuit for outputting data to the data processing unit in response to the data output enable signal and a chip select signal.

5. A memory device, comprising:

a return clock receiving circuit for receiving a return clock supplied from a memory device located at the farthest portion from a data processing unit;

a data output enable signal receiving circuit for receiving a data output enable signal supplied from the memory device located at the farthest position from the data processing unit;

a chip select signal receiving circuit for receiving a chip select signal; and a data output circuit for outputting data to the data processing unit in response to the data output enable signal and the chip select signal.

6. A controller device located at the farther position of the memory devices from a data processing unit and receiving a main clock from the data processing unit, comprising:

a return clock generating circuit for generating a return clock in response to the main clock and for transmitting the return clock to the data processing unit and the memory devices; and a data output enable signal generating circuit for generating a data output enable signal in response to the return clock and for transmitting the data output enable signal to the data processing unit and the memory devices.

7. A memory device, comprising:

a return clock receiving circuit for receiving a return clock supplied from a control device located at the farther position of the memory device from a data processing unit;

a data output enable signal receiving circuit for receiving a data output enable signal supplied from the control device;

a chip select signal receiving circuit for receiving a chip select signal; and a data output circuit for outputting data to the data processing unit in response to the data output enable signal and the chip select signal.

* * * * *